(12) United States Patent
Satoh et al.

(10) Patent No.: US 9,445,062 B2
(45) Date of Patent: Sep. 13, 2016

(54) IMAGING DEVICE, IMAGING SYSTEM, AND IMAGING METHOD

(71) Applicants: Nobuyuki Satoh, Kanagawa (JP); Yasufumi Yamada, Osaka (JP); Hiroaki Kotera, Chiba (JP)

(72) Inventors: Nobuyuki Satoh, Kanagawa (JP); Yasufumi Yamada, Osaka (JP); Hiroaki Kotera, Chiba (JP)

(73) Assignee: Ricoh Company, Ltd., Tokyo (JP)

( * ) Notice: Subject to any disclaimer, the term of this patent is extended or adjusted under 35 U.S.C. 154(b) by 130 days.

(21) Appl. No.: 14/551,215

(22) Filed: Nov. 24, 2014

(65) Prior Publication Data

US 2015/0146053 A1 May 28, 2015

(30) Foreign Application Priority Data

Nov. 27, 2013 (JP) .................................. 2013-245390

(51) Int. Cl.
 *H04N 9/04* (2006.01)
 *H04N 5/225* (2006.01)
 *H04N 5/235* (2006.01)
 *H04N 9/67* (2006.01)
 *G01J 3/46* (2006.01)

(52) U.S. Cl.
 CPC ............... *H04N 9/045* (2013.01); *G01J 3/462* (2013.01); *H04N 5/2256* (2013.01); *H04N 5/2354* (2013.01); *H04N 9/67* (2013.01)

(58) Field of Classification Search
 CPC .................................. G01J 3/51; G01J 1/0488
 USPC ........................................................ 348/279
 See application file for complete search history.

(56) References Cited

U.S. PATENT DOCUMENTS

| | | | | |
|---|---|---|---|---|
| 5,315,209 A | * | 5/1994 | Iwasaki ................ | C09K 11/584 313/112 |
| 5,583,689 A | * | 12/1996 | Cassidy ............. | G02B 6/02085 359/337.2 |
| 5,822,222 A | * | 10/1998 | Kaplinsky ................. | G01J 5/60 250/316.1 |
| 5,914,777 A | * | 6/1999 | Imura .................... | G01J 1/4257 356/121 |
| 6,466,334 B1 | | 10/2002 | Komiya et al. | |
| 6,879,716 B1 | * | 4/2005 | Ishibashi .............. | G06K 9/0063 375/E7.2 |
| 6,980,231 B1 | | 12/2005 | Ohsawa | |
| 7,463,287 B2 | * | 12/2008 | Aotsuka ................ | H04N 9/045 250/226 |
| 7,915,576 B2 | * | 3/2011 | Kanai ............... | H01L 27/14621 250/208.1 |
| 2002/0196456 A1 | | 12/2002 | Komiya et al. | |
| 2004/0160614 A1 | | 8/2004 | Komiya et al. | |

(Continued)

FOREIGN PATENT DOCUMENTS

| | | |
|---|---|---|
| JP | 3767541 | 2/2006 |
| JP | 4076248 | 2/2008 |

(Continued)

OTHER PUBLICATIONS

JP 2010122080 A; Jun. 2010; English Translation.*

*Primary Examiner* — Roberto Velez
*Assistant Examiner* — Cynthia Segure
(74) *Attorney, Agent, or Firm* — Duft Bornsen & Fettig LLP

(57) ABSTRACT

An imaging device includes: a filter formed of four different filter regions with four different spectral transmittances that three different spectral transmittances having characteristics of a color matching function and a spectral transmittance for extracting metallic black have been linearly transformed thereinto by a linear transformation matrix; and an imaging unit that takes an image of light which has come out from a subject, and has been collected by an optical system, and then has passed through the filter.

14 Claims, 16 Drawing Sheets

(56) References Cited

U.S. PATENT DOCUMENTS

| | | |
|---|---|---|
| 2005/0270548 A1 | 12/2005 | Komiya et al. |
| 2006/0103728 A1 | 5/2006 | Ishigami et al. |
| 2006/0175531 A1* | 8/2006 | DiCarlo ............... H04N 17/002 250/208.1 |
| 2006/0222324 A1* | 10/2006 | Abe ...................... H04N 9/045 386/303 |
| 2007/0268377 A1 | 11/2007 | Nagano et al. |
| 2009/0016602 A1 | 1/2009 | Komiya et al. |
| 2011/0194001 A1 | 8/2011 | Eki et al. |
| 2012/0069411 A1 | 3/2012 | Satoh et al. |
| 2012/0218237 A1* | 8/2012 | Shimada ............. G02F 1/13452 345/204 |
| 2012/0236308 A1 | 9/2012 | Satoh |
| 2013/0027720 A1 | 1/2013 | Satoh |
| 2013/0027721 A1 | 1/2013 | Kobayashi et al. |
| 2013/0135484 A1 | 5/2013 | Satoh et al. |
| 2013/0208289 A1 | 8/2013 | Satoh et al. |
| 2013/0229671 A1 | 9/2013 | Yokozawa et al. |
| 2013/0242319 A1 | 9/2013 | Suzuki et al. |
| 2013/0242320 A1 | 9/2013 | Suzuki et al. |
| 2013/0242321 A1 | 9/2013 | Okada et al. |
| 2013/0242361 A1 | 9/2013 | Matsumoto et al. |
| 2013/0258368 A1 | 10/2013 | Shigemoto et al. |
| 2013/0258369 A1 | 10/2013 | Suzuki et al. |
| 2013/0342661 A1* | 12/2013 | Ishii ...................... H04N 9/045 348/49 |
| 2014/0254127 A1* | 9/2014 | Tan ........................ F21V 9/08 362/84 |
| 2015/0097120 A1* | 4/2015 | Weling ............... G01N 21/3577 250/341.2 |
| 2015/0145884 A1* | 5/2015 | Jang ...................... G01J 3/463 345/603 |
| 2015/0172618 A1* | 6/2015 | Takahashi ................ H04N 5/33 348/164 |
| 2015/0207959 A1* | 7/2015 | Kaneko .................... H04N 1/60 348/234 |

FOREIGN PATENT DOCUMENTS

| | | | |
|---|---|---|---|
| JP | 4274632 | 3/2009 | |
| JP | 4285587 | 4/2009 | |
| JP | 2010-122080 | 6/2010 | |
| JP | 2010122080 A * | 6/2010 | ............... G01J 3/51 |
| JP | 2011-166398 | 8/2011 | |
| JP | 4797289 | 8/2011 | |
| JP | 2012-061756 | 3/2012 | |
| JP | 2012-063270 | 3/2012 | |
| JP | 4950544 | 3/2012 | |
| JP | 4983093 | 5/2012 | |

* cited by examiner

FIG.5

IMAGING DEVICE, IMAGING SYSTEM, AND IMAGING METHOD

CROSS-REFERENCE TO RELATED APPLICATIONS

The present application claims priority to and incorporates by reference the entire contents of Japanese Patent Application No. 2013-245390 filed in Japan on Nov. 27, 2013.

BACKGROUND OF THE INVENTION

1. Field of the Invention

The present invention relates to an imaging device, an imaging system, and an imaging method.

2. Description of the Related Art

Conventionally, there have been attempts to develop an imaging device capable of reproducing color as close to that recognized by human sight as possible. Color perceived by a human being depends on a light source that irradiates a subject; therefore, even when an accurate colorimetric value (Lab value or XYZ value, etc.) has been obtained, if a light source in an environment to reproduce the value of color is different, it may be recognized as different color. To resolve this, the spectral reflectance of the subject is found from a spectral distribution (an optical spectrum) of reflected light from the subject and a spectral distribution of the light source, and a display device or image data is corrected by taking into account a spectral distribution of a light source in a reproducing environment so that the same visual appearance of color is obtained.

As a technology to estimate a spectral distribution of reflected light from a subject, there has been proposed estimation by the Wiener estimation method using four types of filters: a K filter for approximately extracting metallic black in addition to filters for extracting colorimetric XYZ tristimulus values (see Japanese Patent Application Laid-open No. 2010-122080).

However, the technology disclosed in Japanese Patent Application Laid-open No. 2010-122080 has problems that due to use of a multiband camera, a device is complicated and expensive, and also has difficulty taking a moving image.

Therefore, it is desirable to provide an imaging device and an imaging system that can be manufactured more easily.

SUMMARY OF THE INVENTION

It is an object of the present invention to at least partially solve the problems in the conventional technology.

According to an aspect of the present invention, there is provided an imaging device including: a filter formed of four different filter regions with four different spectral transmittances that three different spectral transmittances having characteristics of a color matching function and a spectral transmittance for extracting metallic black have been linearly transformed thereinto by a linear transformation matrix; and an imaging unit that takes an image of light which has come out from a subject, and has been collected by an optical system, and then has passed through the filter.

According to another aspect of the present invention, there is provided an imaging method performed by an imaging device including a filter and an imaging unit, the filter formed of four different filter regions with four different spectral transmittances that three different spectral transmittances having characteristics of a color matching function and a spectral transmittance for extracting metallic black have been linearly transformed thereinto by a linear transformation matrix, the imaging unit taking an image of light which has come out from a subject and has been collected by an optical system and then has passed through the filter, and the imaging method including: calculating a colorimetric value on the basis of pixel data output from an imaging unit; estimating a spectral distribution of reflected light from a subject on the basis of four kinds of pixel data output from the imaging unit; taking in outside light and leading the outside light to the imaging unit; estimating a spectral distribution of the outside light on the basis of output four kinds of pixel data obtained by the imaging unit taking an image of the led outside light; and estimating spectral reflectance of the subject by dividing the estimated spectral distribution of the reflected light from the subject by the estimated spectral distribution of the outside light.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 5 is a diagram showing an example of an array of filter regions of the filter;

DETAILED DESCRIPTION OF THE PREFERRED EMBODIMENTS

Exemplary embodiments of an imaging device, an imaging system, and an imaging method for the imaging device according to the present invention will be explained in detail below with reference to accompanying drawings. Incidentally, the present invention is not limited to the following embodiments, and components described in the following embodiments include those can be easily conceived by a person skilled in the art, virtually identical components, and so-called equivalents. Furthermore, various omissions, permutations, and modifications of components can be made without departing from the scope of the following embodiments.

First Embodiment

Overall Structure of Imaging Device

Figure 1:
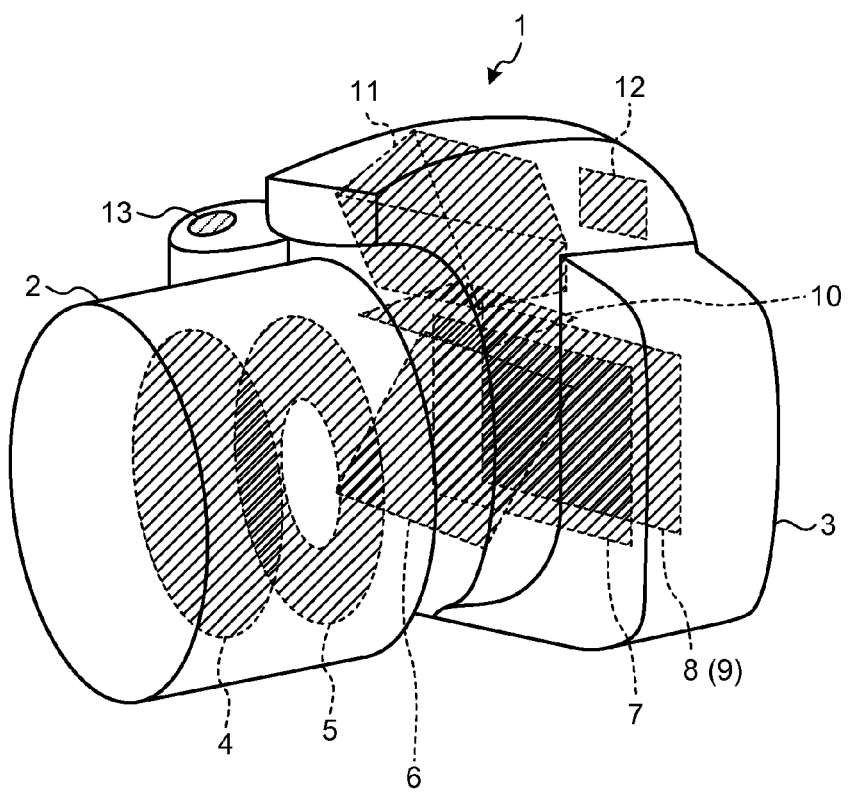
FIG. 1 is a perspective view showing an example of the overall structure of an imaging device.

FIG. 1 is a perspective view showing an example of the overall structure of an imaging device. The overall structure of an imaging device 1 according to a first embodiment is explained with reference to FIG. 1.

As shown in FIG. 1, the imaging device 1 is composed of a lens unit 2 and a main body 3. The lens unit 2 includes a lens 4 (an optical system) and a diaphragm 5. The main body 3 includes a mirror 6, a shutter 7, an imaging element 8 (an imaging unit), a filter 9, a finder screen 10, a pentaprism 11, a finder eyepiece window 12, and a shutter button 13.

The lens 4 is an optical element that collects a light from a subject and forms an image on the imaging element 8. The diaphragm 5 is a member that freely adjusts an amount of light incident on the lens 4.

The mirror 6 is a mirror member that reflects a light incident on the lens 4 to be led into the pentaprism 11 through the finder screen 10. When a user looks through the finder eyepiece window 12 before releasing the shutter (pressing the shutter button 13), the user can confirm a subject to be photographed by reflecting a light incident on the lens 4 to be led into the pentaprism 11. Furthermore, when the user has released the shutter (has pressed the shutter button 13), the mirror 6 moves to a position where a light incident on the lens 4 is not reflected by the mirror 6.

The shutter 7 is a member that shields against a light incident on the lens 4 so that the light does not reach the imaging element 8. When the user has released the shutter (has pressed the shutter button 13), the mirror 6 moves as described above, and the shutter 7 goes into open state, thereby a light incident on the lens 4 reaches the imaging element 8 and is imaged by the imaging element 8.

The imaging element 8 is a solid-state imaging element that converts a light, which has been collected from a subject and incident on the lens 4, into an electrical signal, thereby photographing the subject and generating an image of the subject. The imaging element 8 outputs pixels composing the image taken by sensing elements composing the solid-state imaging element. The imaging element 8 is realized by, for example, a charge-coupled device (CCD) sensor or a complementary metal oxide semiconductor (CMOS) sensor, etc.

The filter 9 is a member that extracts a specific color component from a white light incident on the lens 4, and is placed on an imaging surface of the imaging element 8. Specifically, as will be described later, the filter 9 is composed of an array of filter regions for extracting red (R), blue (B), green (G), and black (K) light components. Details of functions of the filter 9 will be described later.

The finder screen 10 is a member that brings a light, which has been collected from a subject and incident on the lens 4, into focus.

The pentaprism 11 is a prism that is located on the upper center of the main body 3 and is used for the finder eyepiece window 12. The pentaprism 11 also has a function of reversing an image laterally with one of five sides of a pentagonal prism as roof surfaces that the one side is divided into two sides at right angles to each other. In this case, the shape of the pentaprism 11 becomes an octahedron, and three reflections are made in the pentaprism 11. An image obtained through the lens 4 is an inverted image that an original image is turned upside down and reversed laterally; to restore this to an erect image, a light passing through the lens 4 needs to be reflected a total of four times: twice in a vertical direction and twice in a horizontal direction. In the imaging device 1, the light passing through the lens 4 is reflected once by the mirror 6 located at the back of the lens 4 and further reflected three times by the pentaprism 11. Accordingly, an image seen in the finder eyepiece window 12 is obtained as a normal erect image.

The shutter button 13 is an operating member that is pressed by a user to form a light, which has entered the lens 4 and passed through the filter 9, into an image in the imaging element 8. Specifically, when the shutter button 13 has been pressed by the user, as described above, the mirror 6 moves, and the shutter 7 goes into open state, thereby a light incident on the lens 4 reaches the imaging element 8 and is imaged by the imaging element 8.

Spectral Transmittance of Filter

Figure 2:
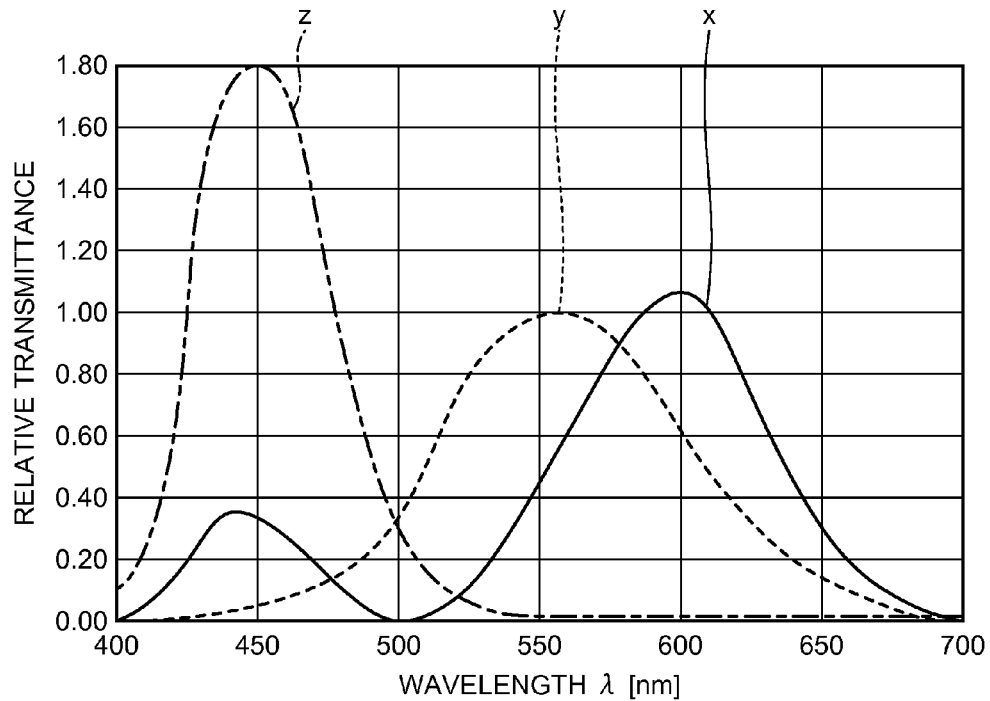
FIG. 2 is a diagram for explaining spectral transmittance based on a color matching function.
Figure 3:
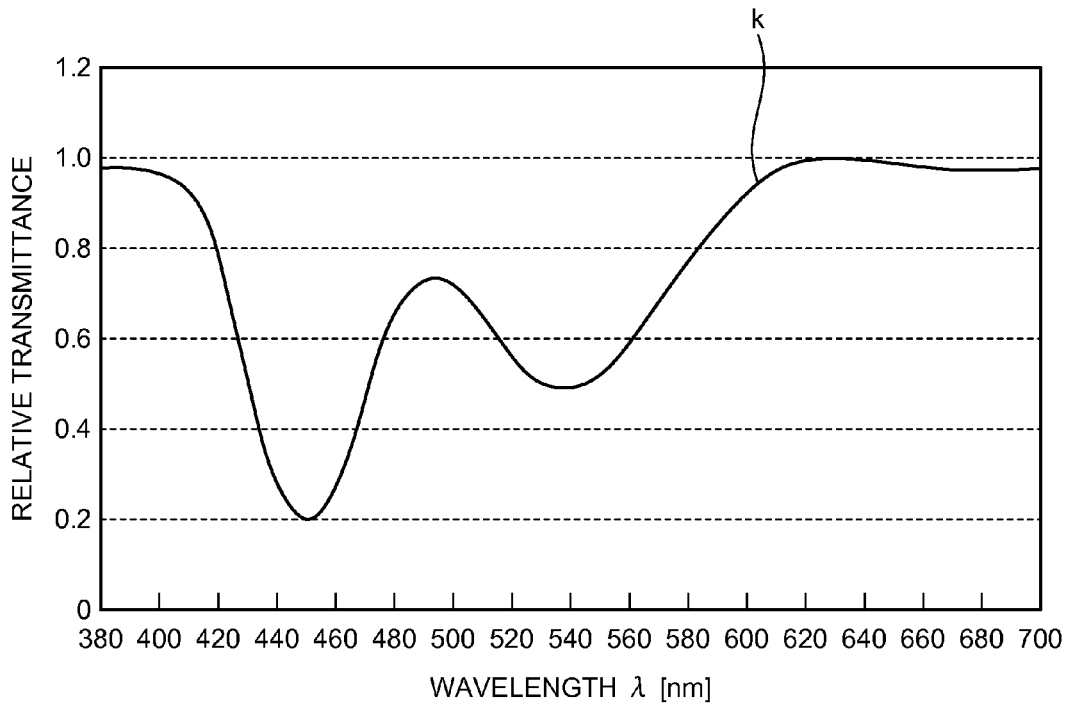
FIG. 3 is a diagram for explaining spectral transmittance of a filter that extracts metallic black.
Figure 4:
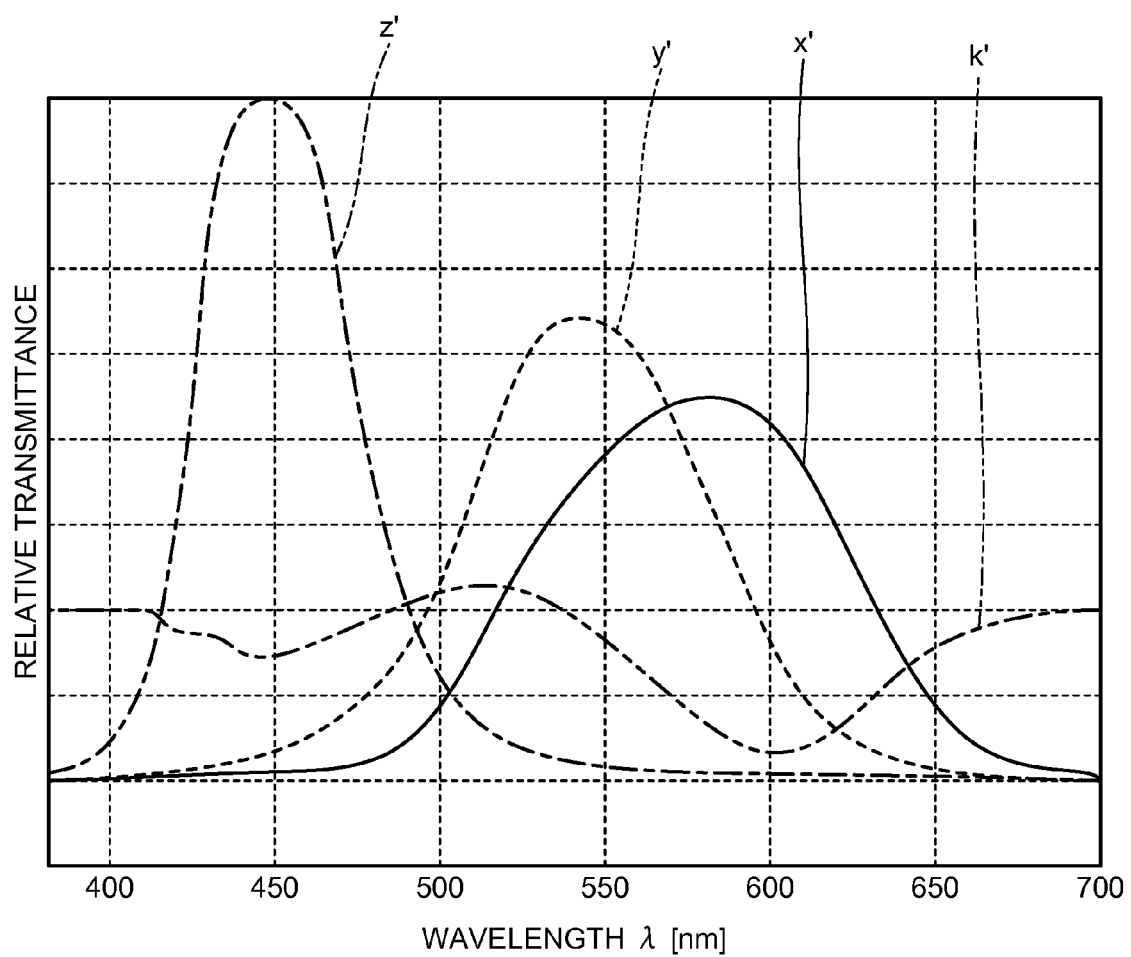
FIG. 4 is a diagram for explaining spectral transmittance of a filter.
Figure 5:
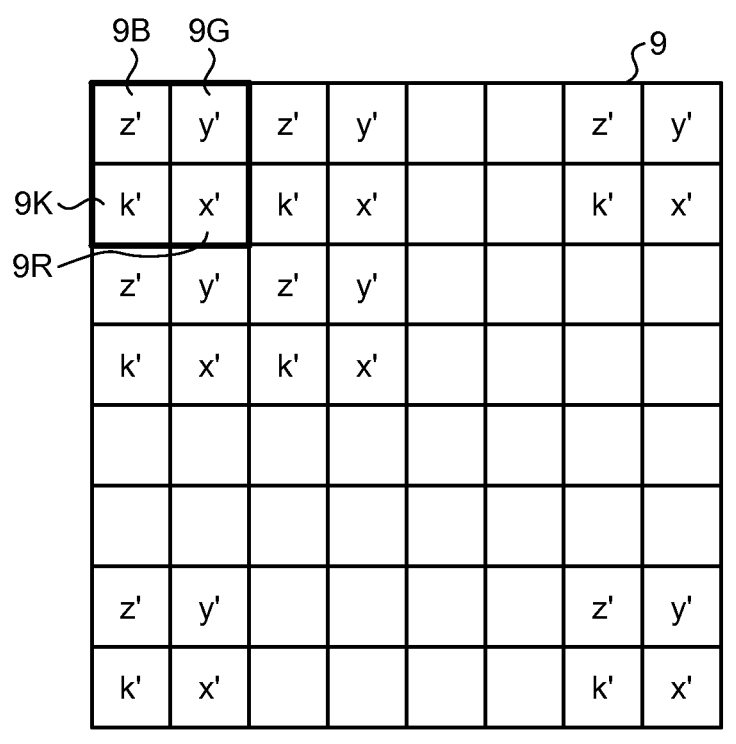

FIG. 2 is a diagram for explaining spectral transmittance based on a color matching function. FIG. 3 is a diagram for explaining spectral transmittance of a filter that extracts metallic black. FIG. 4 is a diagram for explaining spectral transmittance of a filter. FIG. 5 is a diagram showing an example of an array of filter regions of the filter. The spectral transmittance of the filter 9 placed on the imaging surface of the imaging element 8 is explained with reference to FIGS. 2 to 5.

A graph of FIG. 2 showing spectral transmittances of x (red), y (green), and z (blue) is a graph having the same characteristics as a so-called color matching function. There are sensory tissues corresponding to x (red), y (green), and z (blue) in the human eye, and respective sensitivities (spectral sensitivities) of the sensory tissues show characteristics shown in the graph of FIG. 2, and this characteristics is called a color matching function. By using x (red), y (green), and z (blue) filters with the spectral transmittances having such characteristics of a color matching function, color can be measured in a wide color gamut according to the sensitivity of the human eye which completely meets Luther conditions and is an ideal color gamut. The Luther conditions here means that spectral sensitivity characteristics or spectral transmittances are in a linear relationship with a color matching function; however, the graph shown in FIG. 2 is a color matching function itself, so the Luther conditions are met.

However, actually manufacturing filters with the spectral transmittances having the same characteristics as the color matching function shown in FIG. 2 is not easy and is high in cost. Therefore, the filter 9 according to the present embodiment has spectral transmittances shown by graphs of x' (red), y' (green), and z' (blue) out of spectral transmittances (relative transmittances) shown in FIG. 4, which are roughly in a linear relationship with a color matching function (basically meet the Luther conditions). Accordingly, an accurate colorimetric value can be obtained over a wide color gamut.

Furthermore, as shown in FIG. 5, the filter 9 according to the present embodiment has a filter region 9K with a spectral transmittance k' shown in FIG. 4 besides a filter region 9R with a spectral transmittance x', a filter region 9G with a spectral transmittance y', and a filter region 9B with a spectral transmittance z'. That is, in the filter 9, out of a Bayer array of sets of four filter regions: R (red), G (green), B (blue), and G (green) filter regions, one G (green) filter region in each set is replaced by a filter region 9K with a spectral transmittance k'. Before explaining the spectral transmittance k', we explain the spectral transmittance of a filter that extracts metallic black.

A spectral transmittance k for extracting metallic black is shown by, for example, a graph shown in FIG. 3. The metallic black here means a virtual stimulus with tristimulus values of zero. Furthermore, the spectral transmittance of the filter that extracts metallic black means a spectral transmittance with tristimulus values of zero with respect to equi-energy white (of which the spectrum has about the same wavelength intensity in a range of visible wavelengths, i.e., is a flat spectrum). This filter that extracts metallic black has been disclosed in, for example, Japanese Patent Application Laid-open No. 2010-122080.

Then, spectral transmittances x', y', z', and k' are obtained through linear transformation from a combination of the spectral transmittances x, y, and z having the characteristics of the color matching function and the spectral transmittance k for extracting metallic black by a transformation matrix M which enables the linearly-transformed spectral transmittances x', y', and z' to basically meet the Luther conditions and cancels a peak near 450 [nm] in a characteristic of the spectral transmittance x having two peaks (a peak near 450 [nm] and a peak near 600 [nm]). That is, the spectral transmittances x, y, z, and k are linearly transformed into the spectral transmittances x', y', z', and k' by the transformation matrix M according to the following equation (1).

$$\begin{bmatrix} x'(\lambda) \\ y'(\lambda) \\ z'(\lambda) \\ k'(\lambda) \end{bmatrix} = M \cdot \begin{bmatrix} x(\lambda) \\ y(\lambda) \\ z(\lambda) \\ k(\lambda) \end{bmatrix} = \begin{pmatrix} a11 & a21 & a31 & a41 \\ a21 & a22 & a32 & a42 \\ a31 & a32 & a33 & a43 \\ a41 & a42 & a34 & a44 \end{pmatrix} \begin{bmatrix} x(\lambda) \\ y(\lambda) \\ z(\lambda) \\ k(\lambda) \end{bmatrix} \quad (1)$$

The filter 9 is a filter with the spectral transmittances x', y', z', and k' calculated according to the above equation (1), and characteristics of the filter 9 is shown by FIG. 4. Here, the spectral transmittance k' is that the spectral transmittance k for extracting metallic black was linearly transformed by the transformation matrix M in the above equation (1). Furthermore, the reason the filter 9 is configured to have the filter region 9K with the spectral transmittance k' is, as will be described later, to let a subject-spectrum estimating unit 211 accurately estimate a spectral distribution of reflected light from a subject from R (red), G (green), B (blue), and K (black) pixel data of an image of a subject taken by the imaging element 8 (hereinafter, referred to as an imaged RGBK signal). How the subject-spectrum estimating unit 211 estimates a spectral distribution of reflected light from the subject will be described later.

As described above, the spectral transmittances having the characteristics shown in FIG. 4 are obtained by setting the transformation matrix M appropriately, thereby the spectral transmittance x having two peaks becomes the single-peak spectral transmittance x'; therefore, it is possible to facilitate the manufacture of the filter 9. For example, the filter 9 can be manufactured by coating a transparent plastic plate with color materials such as inks mixed so as to approximate respective spectral transmittances of the filter regions 9R, 9G, 9B, and 9K.

Figure 6:
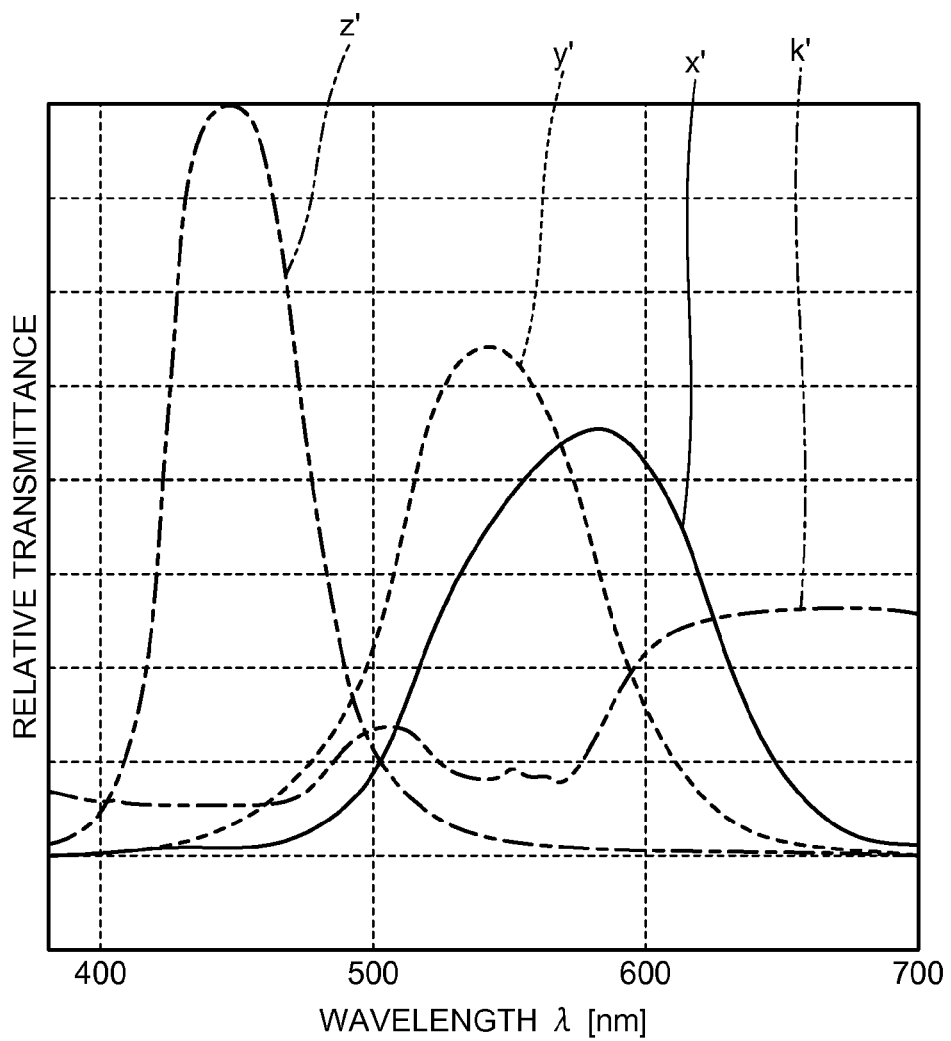
FIG. 6 is a diagram for explaining spectral transmittance of another form of filter.

Incidentally, the linearly-transformed spectral transmittances from the spectral transmittances x, y, z, and k by the transformation matrix M are not limited to the characteristics shown in FIG. 4. For example, the spectral transmittances x', y', z', and k' can be found so that the spectral transmittance k remains unchanged after the linear transformation by the transformation matrix M as shown in FIG. 6, i.e., provided that a41=0, a42=0, a43=0, and a44=0. In this case, as for the colorimetric accuracy and the spectrum estimate accuracy to be described later, it has been confirmed that about the same accuracy performance as in the case of the original spectral transmittances x, y, z, and k can be obtained.

Furthermore, the spectral transmittances x, y, z, and k can be transformed into the spectral transmittances x', y', z', and k' by using a transformation matrix M shown in the following equation (2).

$$M = \begin{pmatrix} 1 & 0 & 0 & 0 \\ 0 & 1 & 0 & 0 \\ 0 & 0 & 1 & 0 \\ 1.2 & 0 & 1.2 & 1 \end{pmatrix} \quad (2)$$

Figure 7:
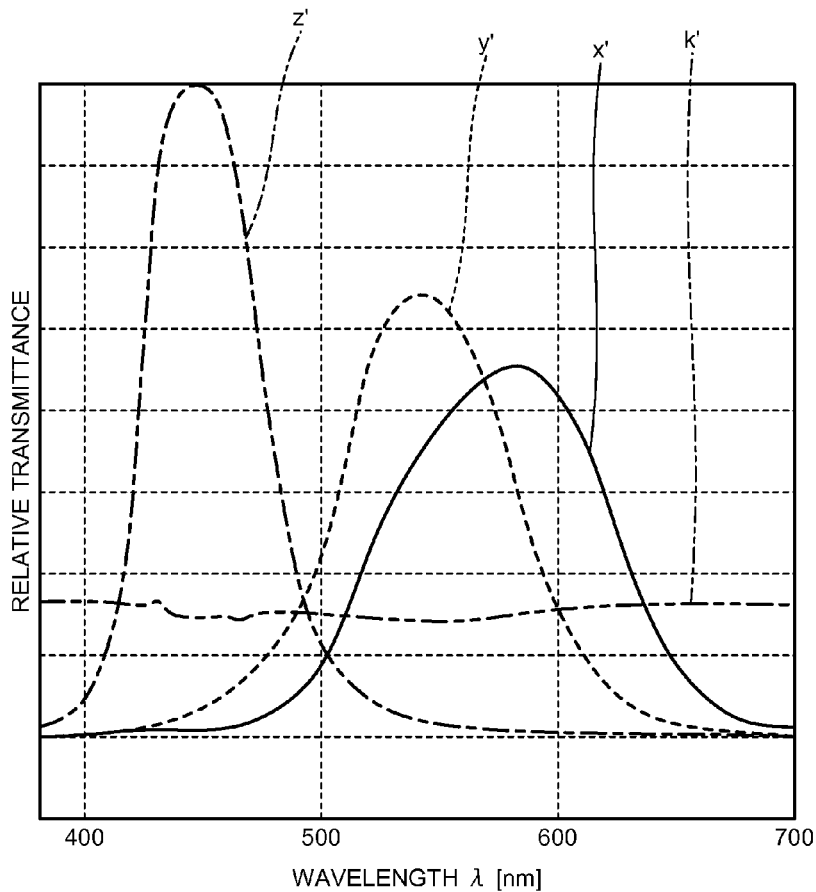
FIG. 7 is a diagram for explaining spectral transmittance of still another form of filter.

Characteristics of the spectral transmittances x', y', z', and k' found by the transformation matrix M in the equation (2) are shown in FIG. 7. Also in this case, the same colorimetric accuracy and spectrum estimate accuracy as the spectral transmittances shown in FIGS. 4 and 6 can be obtained.

Block Configuration of Computing System of Imaging Device

Figure 8:
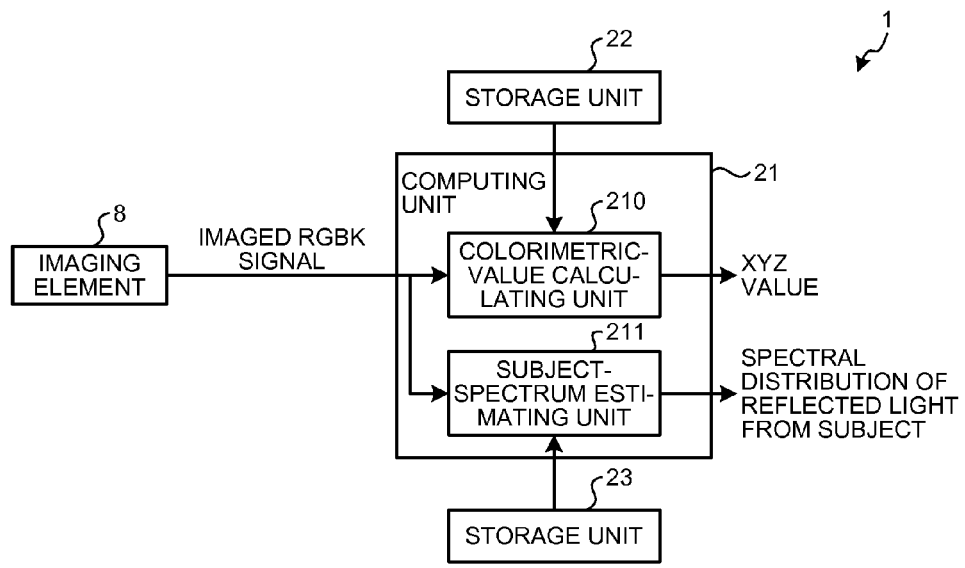
FIG. 8 is a functional block diagram of a computing system of an imaging device according to a first embodiment.

FIG. 8 is a functional block diagram of a computing system of the imaging device according to the first embodiment. A configuration of a functional block of the computing system of the imaging device 1 is explained with reference to FIG. 8.

The imaging device 1 includes, as processing units of the computing system, a computing unit 21, a storage unit 22, and a storage unit 23.

The computing unit 21 includes a colorimetric-value calculating unit 210 (a calculating unit) and the subject-spectrum estimating unit 211 (a first estimating unit).

The colorimetric-value calculating unit 210 converts an imaged RGBK signal into a colorimetric value according to the following equation (3) by a transformation matrix A obtained by the least-squares method on the basis of a relationship between RGBK data obtained in advance by the imaging element 8 imaging a reflected light from a reference patch through the filter 9 and a known colorimetric value (an XYZ value or a Lab value) of the reference patch.

$$\begin{bmatrix} X \\ Y \\ Z \end{bmatrix} = A \cdot \begin{bmatrix} R \\ G \\ B \\ K \end{bmatrix} = \begin{pmatrix} b11 & b12 & b13 & b14 \\ b21 & b22 & b23 & b24 \\ b31 & b32 & b33 & b34 \end{pmatrix} \begin{bmatrix} R \\ G \\ B \\ K \end{bmatrix} \quad (3)$$

Incidentally, a colorimetric value into which the imaged RGBK signal is converted can be an XYZ value or a Lab value, or an XYZ value can be found and then converted into a Lab value. Then, the colorimetric-value calculating unit 210 outputs the converted colorimetric value (the XYZ value in FIG. 8) to the outside. Data of the transformation matrix A has been stored in the storage unit 22, and the colorimetric-value calculating unit 210 references the transformation matrix A in the storage unit 22. In this way, the colorimetric value (the XYZ value in FIG. 8) found by the colorimetric-value calculating unit 210 has been converted on the basis of the imaged RGBK signal which is pixel data of an image taken by the imaging element 8, i.e., an image of light filtered by the filter 9 with the spectral transmittance. Therefore, about the same colorimetric performance as in the case of the original spectral transmittances x, y, z, and k can be obtained.

The subject-spectrum estimating unit 211 estimates a spectral distribution of reflected light from a subject with respect to each of pixels composing an image taken by the imaging element 8 by the publicly-known Wiener estimation method using a covariance matrix as statistical information of the subject stored in the storage unit 23. Then, the subject-spectrum estimating unit 211 outputs the estimated per-pixel spectral distribution of reflected light from the subject to the outside. In this way, a per-pixel spectral distribution of reflected light from a subject is estimated by using not only R (red), G (green), and B (blue) pixel data of an image of the subject taken by the imaging element 8 but also K (black) pixel data, such as an imaged RGBK signal. That is, rather than estimating a spectral distribution of reflected light from the subject from the R (red), G (green), and B (blue) pixel data by the publicly-known method (for example, Japanese Patent No. 4274632), a spectral distribution of reflected light from the subject is estimated by acquiring part of color components filtered out by the filters with the spectral transmittances x', y', and z' through filtering by the filter with the spectral transmittance k'. In other words, a spectral distribution of reflected light from the subject is estimated from more color component information than the above-described publicly-known method; therefore, the estimate accuracy can be improved.

Overview of Spectral-Distribution Estimating Operation

Figure 9:
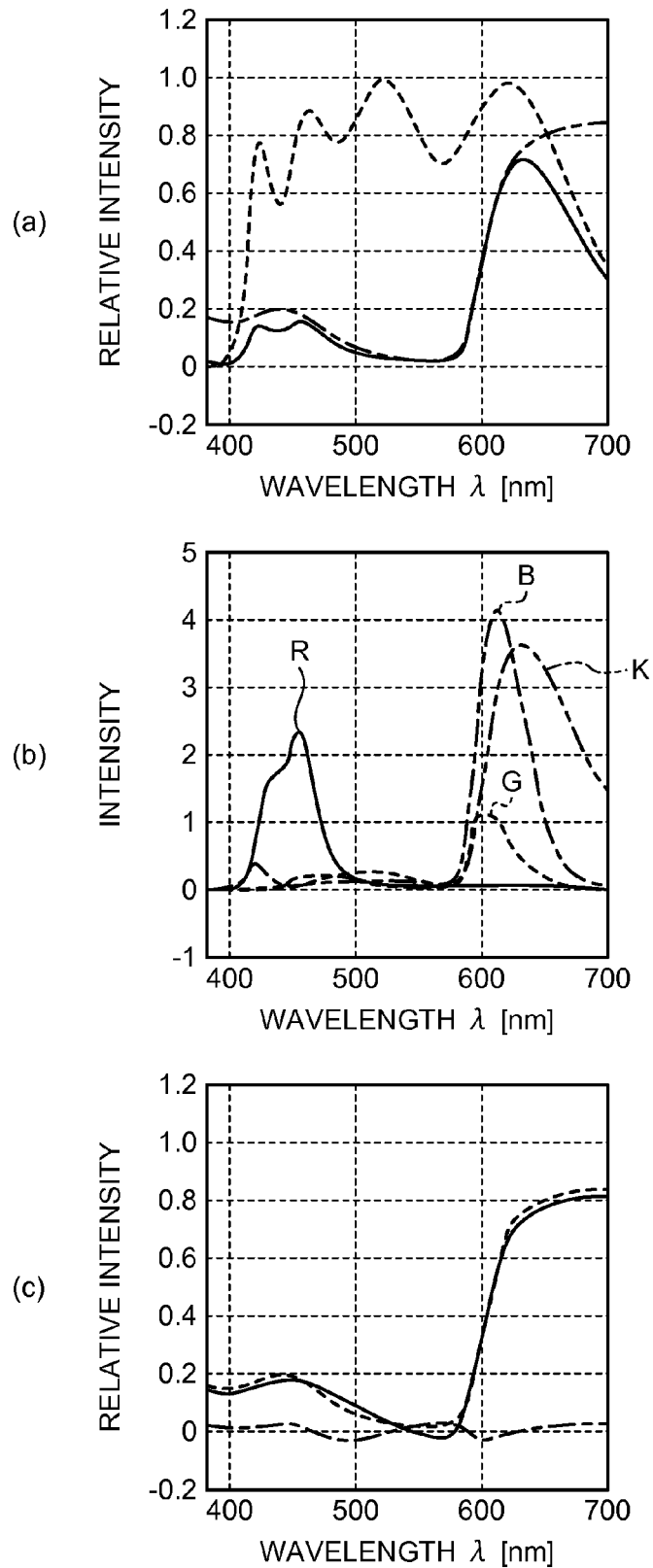
FIG. 9 is a diagram for explaining operation of a subject-spectrum estimating unit.

FIG. 9 is a diagram for explaining the operation of the subject-spectrum estimating unit. An overview of the estimating operation by the subject-spectrum estimating unit 211 of the computing unit 21 is explained with reference to FIG. 9.

A dotted line graph in FIG. 9(*a*) exemplarily shows a spectral distribution of outside light. A dashed-dotted line graph in FIG. 9(*a*) shows a true value of spectral transmittance of a subject obtained by the imaging element 8. A solid line graph in FIG. 9(*a*) shows a spectral distribution of the subject (reflected light) calculated by multiplying the dotted line graph (the spectral distribution of outside light) by the dashed-dotted line graph (the spectral transmittance of the subject).

When the spectral distribution of reflected light from the subject shown by the solid line graph in FIG. 9(*a*) has passed through the four filter regions 9R, 9G, 9B, and 9K of the filter 9, spectral characteristics shown in FIG. 9(*b*) (R, G, B, and K in FIG. 9(*b*) correspond to the filter regions 9R, 9G, 9B, and 9K of the filter 9, respectively) are obtained, and four pixel data (an imaged RGBK signal) is obtained as a value of integral of graphs with the spectral characteristics from image data output from the imaging element 8.

The subject-spectrum estimating unit 211 estimates a spectral distribution of reflected light from a subject by the publicly-known Wiener estimation method using an imaged RGBK signal and a covariance matrix as statistical information of the subject stored in the storage unit 23. A solid line graph in FIG. 9(C) shows an estimate value of spectral transmittance of the subject calculated from a spectral distribution of outside light if known and a spectral distribution of reflected light from the subject estimated by the subject-spectrum estimating unit 211. A dotted line graph in FIG. 9(*c*) shows a true value of spectral transmittance of the subject, and a dashed-dotted line graph shows an error between the estimate value and the true value of spectral transmittance of the subject. The result shown in FIG. 9(*c*) found that the spectral distribution of reflected light from the subject can be estimated accurately through the process performed by the subject-spectrum estimating unit 211.

As described above, the imaging device 1 according to the present embodiment includes the filter 9 with the spectral transmittances x', y', z', and k' obtained through linear transformation from the combination of the spectral transmittances x, y, and z having the characteristics of the color matching function and the spectral transmittance k for extracting metallic black by a transformation matrix which enables the linearly-transformed spectral transmittances x', y', and z' to basically meet the Luther conditions and cancels a peak on the low wavelength side in a characteristic of the spectral transmittance x having two peaks. The imaging device 1 obtains four kinds of pixel data (an imaged RGBK signal) by causing the imaging element 8 to take an image of light passing through the filter 9. Then, the colorimetric-value calculating unit 210 converts the imaged RGBK signal into a colorimetric value by the transformation matrix A. Accordingly, the accuracy of the obtained colorimetric value can be about the same accuracy as the original spectral transmittances x, y, z, and k; therefore, color can be measured in a wide color gamut according to the spectral sensitivity of the human eye. Furthermore, by installing the filter 9 with the above-described spectral transmittances, a moving image can be taken by highly accurate colorimetry.

Furthermore, the subject-spectrum estimating unit 211 estimates a spectral distribution of reflected light from a subject by the publicly-known Wiener estimation method using the imaged RGBK signal and a covariance matrix; therefore, the spectral distribution of reflected light from the subject can be estimated with high accuracy. Such an estimated spectral distribution of reflected light from a subject can be applied to, for example, discrimination between normal product and abnormal product among products or industrial goods which are difficult to discriminate by the human eye only.

Moreover, as described above, the spectral transmittances having the characteristics shown in FIG. 4 are obtained by setting the transformation matrix M appropriately, thereby the spectral transmittance x having two peaks becomes the single-peak spectral transmittance x'; therefore, it is possible to facilitate the manufacture of the filter 9, and also possible to reduce the manufacturing cost. Furthermore, the filter 9 has spectral transmittances shown by the graphs of x' (red), y' (green), and z' (blue) out of the spectral transmittances (relative transmittances) shown in FIG. 4, which are roughly in a linear relationship with the color matching function (basically meet the Luther conditions); therefore, an accurate colorimetric value can be obtained over a wide color gamut.

Moreover, as shown in FIG. 8, the imaging device 1 includes the computing unit 21, and the colorimetric-value calculating unit 210 of the computing unit 21 calculates a colorimetric value, and the subject-spectrum estimating unit 211 estimates a spectral distribution of reflected light from a subject; however, the present invention is not limited to this configuration. That is, the imaging device 1 does not have to include the computing unit 21; for example, the computing unit 21 can be included in an external device, and the external device can execute a computing function of the computing unit 21 according to a received imaged RGBK signal. Furthermore, not the computing unit 21 itself but either the colorimetric-value calculating unit 210 or the subject-spectrum estimating unit 211 can be included in the external device.

Variation of First Embodiment

Figure 10:
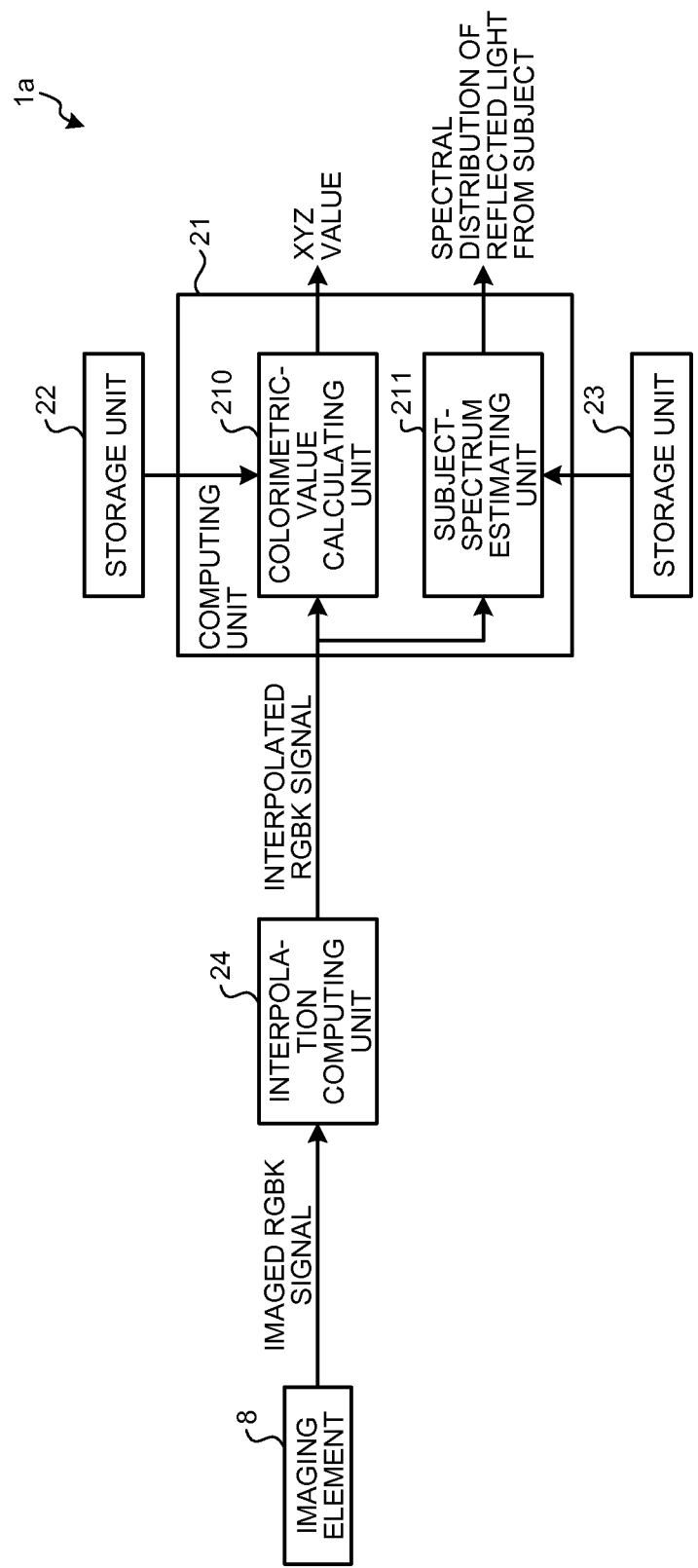
FIG. 10 is a functional block diagram of a computing system of an imaging device according to a variation of the first embodiment.

FIG. 10 is a functional block diagram of a computing system of an imaging device according to a variation of the first embodiment. A configuration and operation of a functional block of a computing system of an imaging device 1a according to the present variation are explained with reference to FIG. 10 with a focus on differences from the configuration and operation of the imaging device 1 according to the first embodiment.

The imaging device 1a includes, as processing units of the computing system, the computing unit 21, the storage unit 22, the storage unit 23, and an interpolation computing unit 24 (an interpolation computing unit).

As to four kinds of pixel data in an imaged RGBK signal in the first embodiment, only a value of single color corresponds to one pixel; therefore, when color conversion is performed in units of four pixels, the resolution of an image is reduced. Accordingly, in the present variation, the interpolation computing unit 24 performs Bayer interpolation. Here, blocks composing an image taken by the imaging element 8 are referred to as "pixels".

As described above, each of pixels of an image output by the imaging element 8 corresponds to any one of R, G, B, and K pixels. Estimating the other colors other than the color of a pixel (if it is an R pixel, G, B, and K colors) from single-color pixel data of its surrounding pixels is the Bayer interpolation. That is, the Bayer interpolation is a process to associate each pixel with not single-color pixel data but four R, G, B, and K pixel data.

Specifically, for example, centering on a pixel subject to Bayer interpolation, 3×3 pixels (pixel areas) are set as objects to be operated. Next, color of the target pixel (the center pixel) is associated with pixel data corresponding to the color of the center pixel. Then, the other colors other than the color of the center pixel are associated with a value obtained by calculating an average value of pixels values of the other colors included in pixel data of eight pixels surrounding the center pixel as pixel data of the other colors corresponding to the center pixel. As a result, each of pixels composing an image taken by the imaging element 8 is associated with four R, G, B, and K data; this four color data corresponding to each pixel after the Bayer interpolation is referred to as interpolated RGBK signal.

As described above, by using the interpolated RGBK signal obtained through the interpolation (Bayer interpolation) by the interpolation computing unit 24, calculation of a colorimetric value by the colorimetric-value calculating unit 210 and estimate of a spectral distribution of reflected light from a subject by the subject-spectrum estimating unit 211 can be performed while suppressing reduction in the resolution of an image.

Incidentally, the interpolation by the interpolation computing unit 24 is described as Bayer interpolation; however, it is not limited to this.

Second Embodiment

An imaging device according to a second embodiment is explained with a focus on differences from the configuration and operation of the imaging device 1 according to the first embodiment.

Structure of Main Section of Imaging Device

Figure 11:
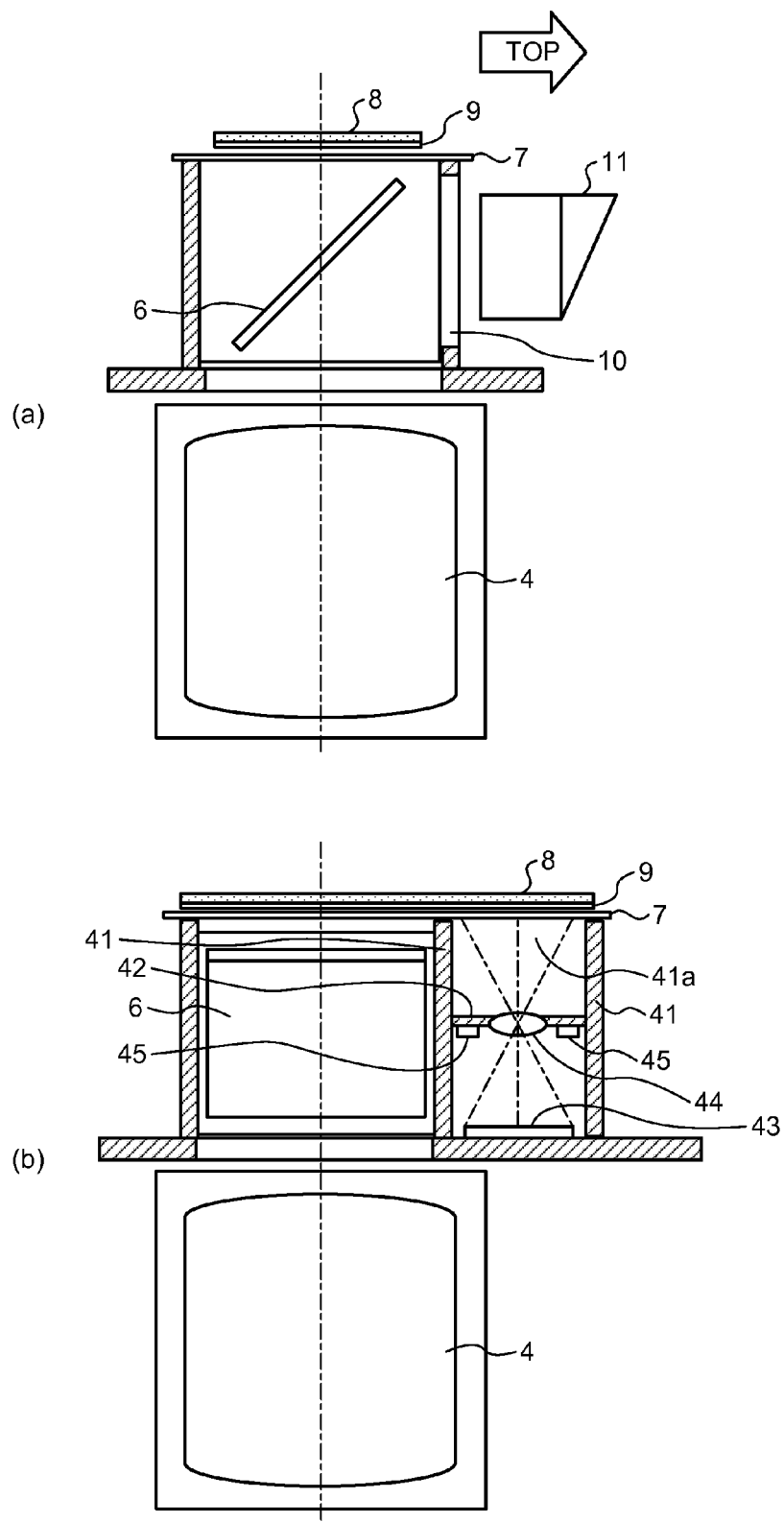
FIG. 11 is a diagram showing an example of the structure of a main section of an imaging device according to a second embodiment.
Figure 12:
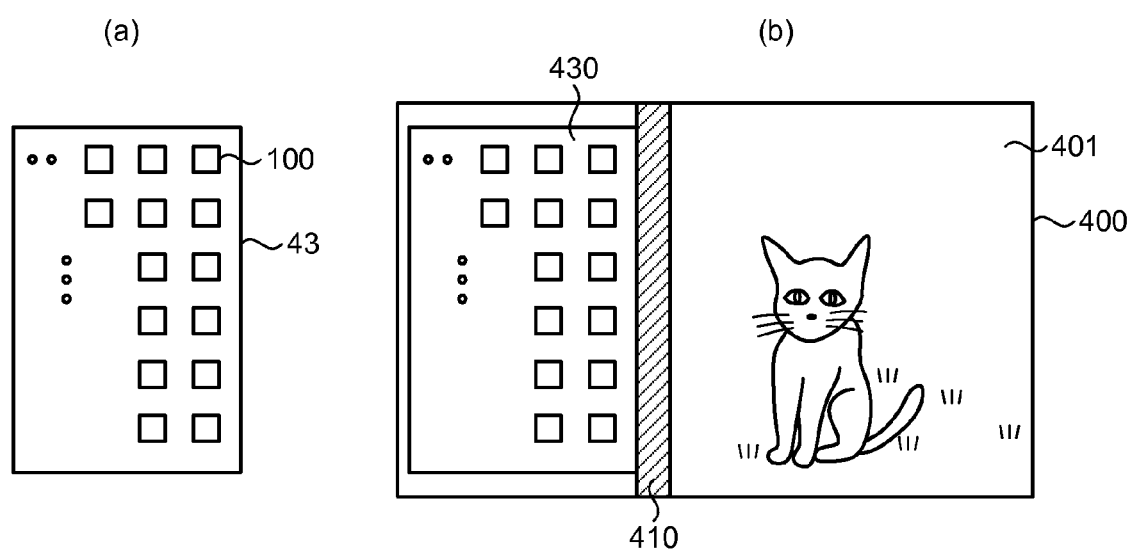
FIG. 12 is a diagram showing an example of an image taken by an imaging element of the imaging device according to the second embodiment.

FIG. 11 is a diagram showing an example of the structure of a main section of the imaging device according to the second embodiment. FIG. 12 is a diagram showing an example of an image taken by an imaging element of the imaging device according to the second embodiment. The structure of a main section of an imaging device 1b according to the present embodiment is explained with reference to FIGS. 11 and 12.

FIG. 11(a) is a left side view of the main section including the lens 4 of the imaging device 1b, and FIG. 11(b) is a top view of the main section. A position relation among the lens 4, the mirror 6, the shutter 7, the imaging element 8, the filter 9, the finder screen 10, and the pentaprism 11 is as explained in the first embodiment, i.e., as shown by FIG. 1.

In the imaging device 1b according to the present embodiment, a box-shaped enclosure 41 is placed adjacent to the mirror 6 (on the right side of the mirror 6 in FIG. 11(b)). One side of the enclosure 41 is open (has an opening 41a), and the opening 41a is opposed to the shutter 7, the imaging element 8, and the filter 9. Inside the enclosure 41, a first partition plate 42 is placed roughly parallel to the surface of the plate-like imaging element 8 and near the center of the enclosure 41 in a direction vertical to the surface of the imaging element 8. Inside the enclosure 41, a reference chart part 43 shown in FIG. 12(a) is placed on an inner wall surface of the enclosure 41 roughly parallel to the surface of the imaging element 8 on the side of the lens 4. As shown in FIG. 12(a), multiple different color patches 100 are set in the reference chart part 43. An imaging lens 44 is placed on the center of the first partition plate 42, and an LED 45 (an illuminating unit) for illuminating the reference chart part 43 is placed on the surface of the first partition plate 42 on the side of the reference chart part 43.

In a case where calibration is performed by a calibration unit 25 to be described later, when a user has released the shutter, the mirror 6 moves, and the shutter 7 goes into open state, thereby a light which has been reflected by the reference chart part 43 and passed through the imaging lens 44 out of light incident on the lens 4 and light emitted from the LED 45 reaches the imaging element 8 and is imaged by the imaging element 8. An image taken at that time is a taken image 400 shown in FIG. 12(b). The taken image 400 includes a chart image area 430 for an image of the reference chart part 43, a frame image area 410 for an image of a part of the enclosure 41, and a subject image area 401 for an image of light from a subject. Incidentally, the calibration does not have to be performed at the timing at which the shutter has been released by a user; for example, the calibration can be performed at predetermined time intervals. Furthermore, at the time of calibration, it is not necessary to take an image of light incident on the lens 4 (light from the subject).

Block Configuration of Imaging Device

Figure 13:
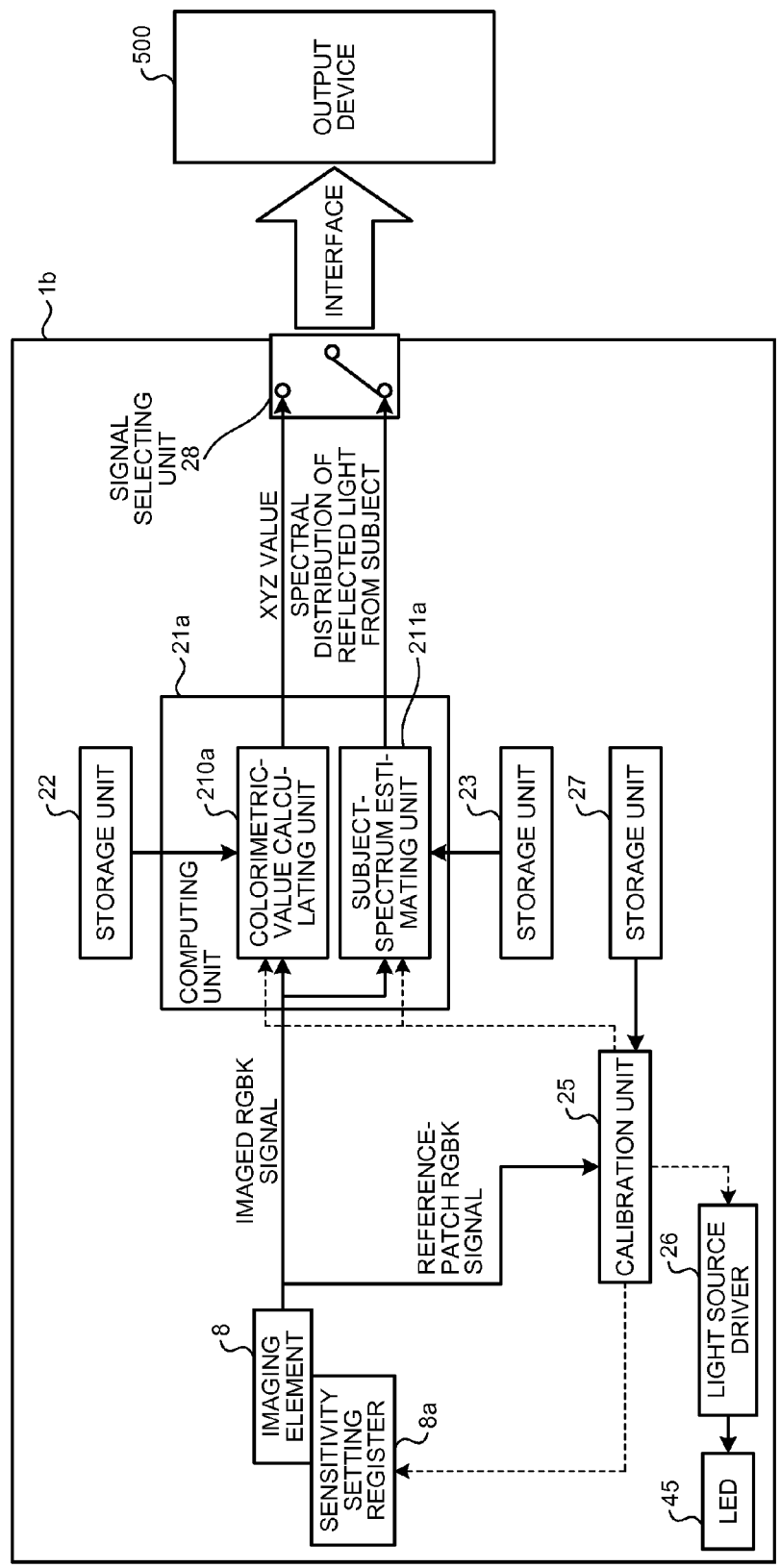
FIG. 13 is a functional block diagram of a computing system of the imaging device according to the second embodiment.

FIG. 13 is a functional block diagram of a computing system of the imaging device according to the second embodiment. A configuration of a functional block of the imaging device 1*b* is explained with reference to FIG. 13.

The imaging device 1*b* includes the imaging element 8, a computing unit 21*a*, the storage unit 22, the storage unit 23, the calibration unit 25 (a calibration unit), a light source driver 26, a storage unit 27, and a signal selecting unit 28.

The computing unit 21*a* includes a colorimetric-value calculating unit 210*a* (a calculating unit) and a subject-spectrum estimating unit 211*a* (a first estimating unit).

The colorimetric-value calculating unit 210*a* corrects pixel data (an imaged RGBK signal) of an image of a subject taken by the imaging element 8 according to a correction value calculated by the calibration unit 25. The colorimetric-value calculating unit 210*a* converts the corrected imaged RGBK signal into a colorimetric value by the above-described transformation matrix A obtained by reference to the storage unit 22. Incidentally, a colorimetric value into which the imaged RGBK signal is converted can be an XYZ value or a Lab value. Then, the colorimetric-value calculating unit 210*a* outputs the converted colorimetric value to the signal selecting unit 28.

The subject-spectrum estimating unit 211*a* corrects an imaged RGBK signal according to the correction value in the same manner as the colorimetric-value calculating unit 210*a*, and, with respect to each of pixels composing an image taken by the imaging element 8, estimates a spectral distribution of reflected light from a subject from the corrected imaged RGBK signal by the publicly-known Wiener estimation method using a covariance matrix as statistical information of the subject stored in the storage unit 23. Then, the subject-spectrum estimating unit 211*a* outputs data of the estimated per-pixel spectral distribution of reflected light from the subject to the signal selecting unit 28.

The signal selecting unit 28 outputs data to an external output device 500 via a communication interface. The signal selecting unit 28 selects either a colorimetric value calculated by the colorimetric-value calculating unit 210*a* or data of per-pixel spectral distribution of reflected light from a subject estimated by the subject-spectrum estimating unit 211*a*, and outputs the selected data to the output device 500.

The calibration unit 25 performs calibration on the basis of image data of an image of the reference chart part 43 taken by the imaging element 8 (hereinafter, referred to as a reference-patch RGBK signal). In the calibration, when the imaging element 8 takes an image, the calibration unit 25 controls the light source driver 26 so as to turn on the LED 45. The storage unit 27 stores therein respective colorimetric values and RGBK signal values of the patches 100 set in the chart image area 430 when the imaging device 1*b* is in initial state (for example, at the time of factory shipment, etc.).

An example of the calibration operation by the calibration unit 25 is explained below. The light sensitivity of the imaging element 8 varies with time. This affects a colorimetric value of a subject; therefore, to obtain a highly-accurate colorimetric value of a subject, it is necessary to perform a correction to eliminate the variation in the light sensitivity. The operation for calculating a correction value to perform the correction is calibration.

First, in the initial state, the imaging device 1*b* takes an image of the patches 100 included in the reference chart part 43, and stores a colorimetric value including at least either an XYZ value or a Lab value of each patch, for example, in a table set in the storage unit 27 in a manner associated with a patch number of the patch. Hereinafter, the colorimetric value of each patch 100 stored in the table is referred to as a "reference colorimetric value". Furthermore, in the initial state, the imaging device 1*b* stores a reference-patch RGBK signal obtained by imaging each patch 100 included in the reference chart part 43 in the table in a manner associated with a patch number of the patch. Hereinafter, a reference-patch RGBK signal of each patch 100 stored in the table is referred to as a "reference RGBK value". The reference RGBK value is a value reflecting characteristics of the light sensitivity of the imaging element 8 in the initial state.

Next, at the time of calibration by the calibration unit 25, the imaging element 8 takes an image of the multiple patches 100 set in the reference chart part 43 as a subject. Then, a reference-patch RGBK signal of each patch 100 obtained by taking the image of the patch is stored in the table in the storage unit 27 in a manner associated with a patch number of the patch. Hereinafter, a reference-patch RGBK signal of each patch 100 stored in the table at the time of calibration is referred to as a "calibration RGBK value". That is, respective reference colorimetric values, reference RGBK signals, and calibration RGBK values of the multiple patches 100 formed and arranged in the reference chart part 43 are stored in the table in a manner associated with a patch number of each patch 100. The calibration RGBK value is a value reflecting characteristics of the light sensitivity of the imaging element 8 that varies with time.

When the calibration RGBK values of the reference chart part 43 have been stored in the table in the storage unit 27, the calibration unit 25 generates a linear transformation matrix (a correction value) for mutual transformation between a reference RGBK value and calibration RGBK value corresponding to the same patch number, and stores the generated linear transformation matrix in the storage unit 27. This calibration by the calibration unit 25 is performed not on each subject imaging operation but at predetermined time intervals. The colorimetric-value calculating unit 210*a* and the subject-spectrum estimating unit 211*a* receive a correction value stored in the storage unit 27 from the calibration unit 25, and correct an input imaged RGBK signal by using the received correction value.

Incidentally, when the calibration unit 25 has performed calibration and calculated a correction value, the calibration unit 25 can output the correction value to the colorimetric-value calculating unit 210*a* and the subject-spectrum estimating unit 211*a*, and the colorimetric-value calculating unit 210*a* can store the received correction value in the storage unit 22, and the subject-spectrum estimating unit 211*a* can store the received correction value in the storage unit 23. Furthermore, as described above, the calibration unit 25 passes the calculated correction value to the colorimetric-value calculating unit 210*a* and the subject-spectrum estimating unit 211*a*; however, it is not limited to this. That is, the calibration unit 25 can correct a sensitivity setup value stored in a sensitivity setting register 8*a* (see FIG. 13) for determining the light sensitivity of the imaging element 8 on the basis of the calculated correction value so that the temporal variation in light sensitivity can be eliminated.

As described above, the same effects as in the first embodiment can be achieved, and a correction value is calculated by calibration; therefore, in a state where the temporal variation in light sensitivity of the imaging element 8 is constantly compensated, the colorimetric-value calculating unit 210*a* and the subject-spectrum estimating unit 211a can calculate a colorimetric value and estimate a spectral distribution of reflected light from a subject, respectively.

Furthermore, the signal selecting unit 28 selects either a colorimetric value calculated by the colorimetric-value calculating unit 210a or data of per-pixel spectral distribution of reflected light from a subject estimated by the subject-spectrum estimating unit 211a, and outputs the selected data to the output device 500. Accordingly, data required for the output device 500 to perform image processing can be selected and input from the imaging device 1b.

Incidentally, the interpolation computing unit 24 of the imaging device 1a according to the variation of the first embodiment can be applied to the imaging device 1b according to the present embodiment.

Furthermore, as shown in FIG. 13, the imaging device 1b includes the computing unit 21a, and a colorimetric value is calculated by the colorimetric-value calculating unit 210a of the computing unit 21a, and a spectral distribution of reflected light from a subject is estimated by the subject-spectrum estimating unit 211a; however, the present invention is not limited to this configuration. That is, the imaging device 1b does not have to include the computing unit 21a; for example, the computing unit 21a can be included in an external device such as the output device 500, and the external device can execute a computing function of the computing unit 21a according to a received imaged RGBK signal and correction value. Furthermore, not the computing unit 21a itself but either the colorimetric-value calculating unit 210a or the subject-spectrum estimating unit 211a can be included in the external device.

Third Embodiment

An imaging device according to a third embodiment is explained with a focus on differences from the configuration and operation of the imaging device 1b according to the second embodiment.

Structure of Main Section of Imaging Device

Figure 14:
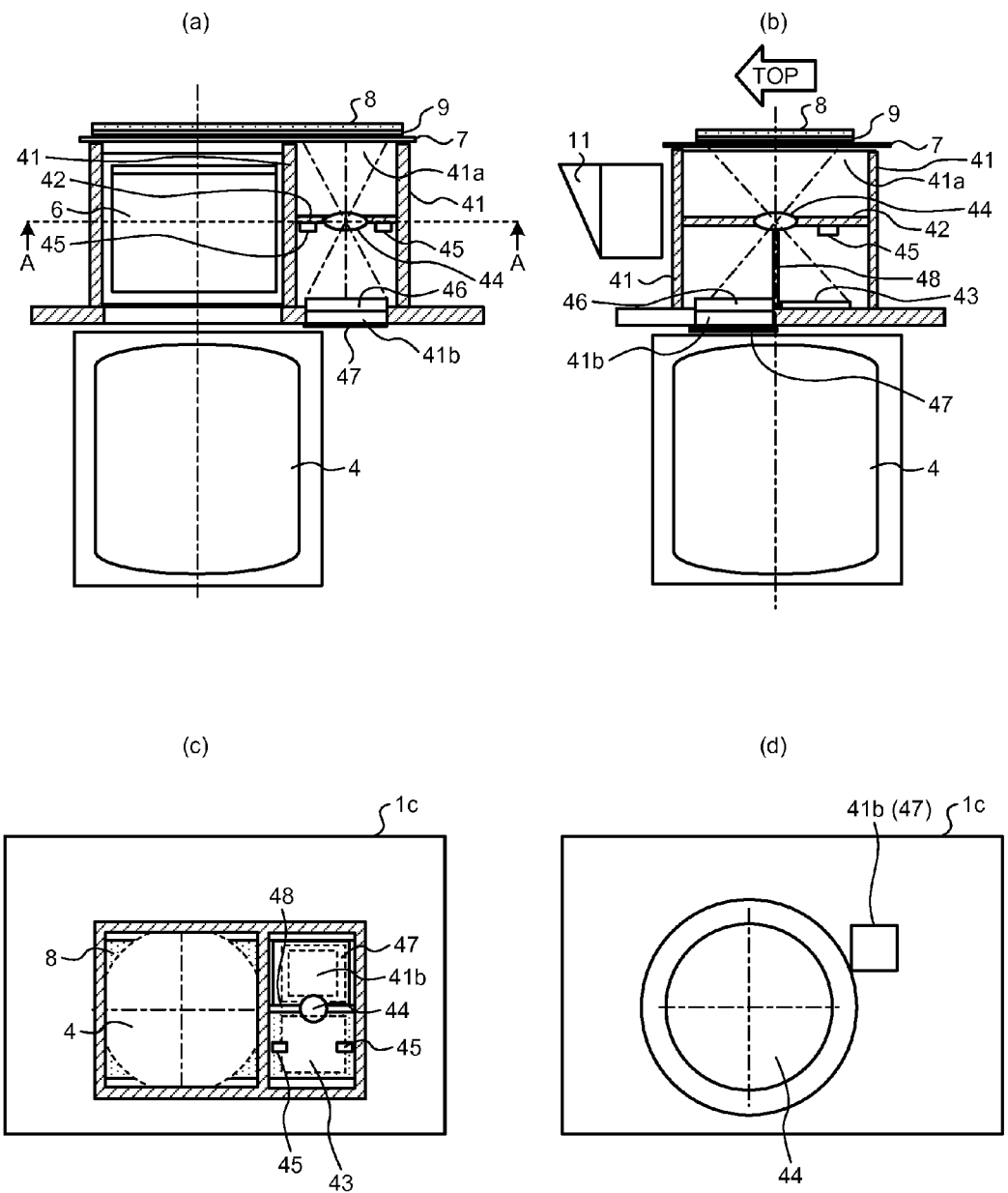
FIG. 14 is a diagram showing an example of the structure of a main section of an imaging device according to a third embodiment.
Figure 15:
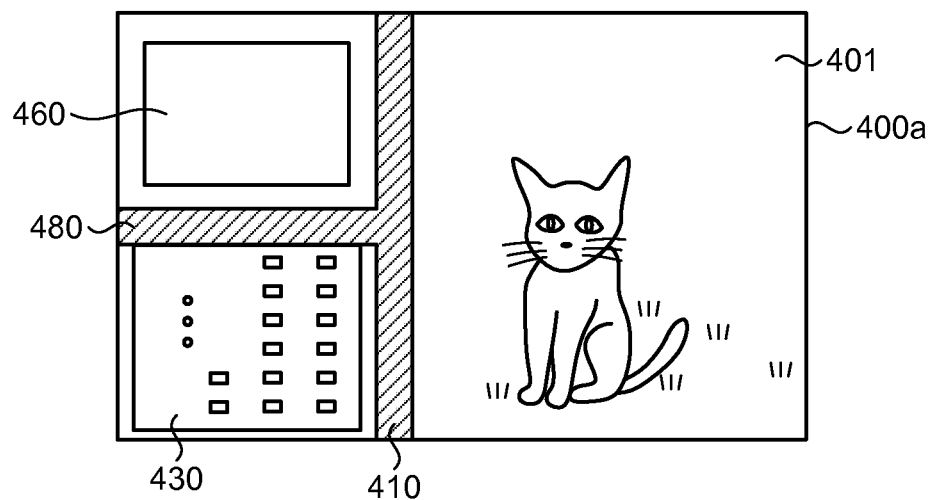
FIG. 15 is a diagram showing an example of an image taken by an imaging element of the imaging device according to the third embodiment.

FIG. 14 is a diagram showing an example of the structure of a main section of the imaging device according to the third embodiment. FIG. 15 is a diagram showing an example of an image taken by an imaging element of the imaging device according to the third embodiment. The structure of a main section of an imaging device 1c according to the present embodiment is explained with reference to FIGS. 14 and 15.

FIG. 14(a) is a top view of the main section including the lens 4 of the imaging device 1c; FIG. 14(b) is a right side view of the main section; FIG. 14(c) is a cross-sectional view of the main section along the line A-A shown in FIG. 14(a); FIG. 14(d) is a front view of the main section. A position relation among the lens 4, the mirror 6, the shutter 7, the imaging element 8, the filter 9, and the pentaprism 11 shown in FIG. 14 is as explained in the first embodiment, i.e., as shown by FIG. 1.

In the imaging device 1c according to the present embodiment, the box-shaped enclosure 41 is placed adjacent to the mirror 6 (on the right side of the mirror 6 in FIG. 14(a)). One side of the enclosure 41 is open (has the opening 41a), and the opening 41a is opposed to the shutter 7, the imaging element 8, and the filter 9. Inside the enclosure 41, the first partition plate 42 is placed roughly parallel to the surface of the plate-like imaging element 8 and near the center of the enclosure 41 in a direction vertical to the surface of the imaging element 8. A space in the enclosure 41 on the side of the lens 4 partitioned with the first partition plate 42 is partitioned with a second partition plate 48 extending from about the center of the first partition plate 42 in vertical direction toward the lens 4 in a direction perpendicular to the first partition plate 42 and reaching the inner wall surface of the enclosure 41 on the side of the lens 4. The imaging lens 44 is placed on the center of the first partition plate 42, and lights from an upper space and lower space partitioned with the second partition plate 48 pass through the imaging lens 44 and head toward the imaging element 8.

In the upper space, an opening 41b is formed on the inner wall surface roughly parallel to the surface of the imaging element 8 on the side of the lens 4. A diffuser panel 46 for diffusing light passing therethrough is placed so as to cover the opening 41b from the inside of the upper space. Furthermore, a shutter 47 for opening and closing the opening 41b is placed in the opening 41b. The opening 41b and the shutter 47 serve as an outside-light intake unit.

In the lower space, the reference chart part 43 (see FIG. 12) is placed on the inner wall surface roughly parallel to the surface of the imaging element 8 on the side of the lens 4. The LED 45 for illuminating the reference chart part 43 is placed on the surface of the first partition plate 42 on the side of the reference chart part 43 in the lower space.

In a case where calibration is performed by the calibration unit 25, when a user has released the shutter, the mirror 6 moves, and the shutter 7 goes into open state, thereby a light which has been reflected by the reference chart part 43 and passed through the imaging lens 44 out of light incident on the lens 4 and light emitted from the LED 45 reaches the imaging element 8 and is imaged by the imaging element 8. An image taken at that time is a taken image 400a shown in FIG. 15. The taken image 400a includes the chart image area 430 for an image of the reference chart part 43, the frame image area 410 for an image of a part of the enclosure 41, an outside-light image area 460 for an image of outside light having entered through the opening 41b, a partition-plate image area 480 for an image of the second partition plate 48, and the subject image area 401 for an image of light from a subject. Incidentally, the calibration does not have to be performed at the timing at which the shutter has been released by a user; for example, the calibration can be performed at predetermined time intervals. Furthermore, at the time of calibration, it is not necessary to take an image of light incident on the lens 4 (light from the subject) and an image of light that has entered through the opening 41b and passed through the imaging lens 44 when the shutter 47 has gone into open state.

Block Configuration of Imaging Device

Figure 16:
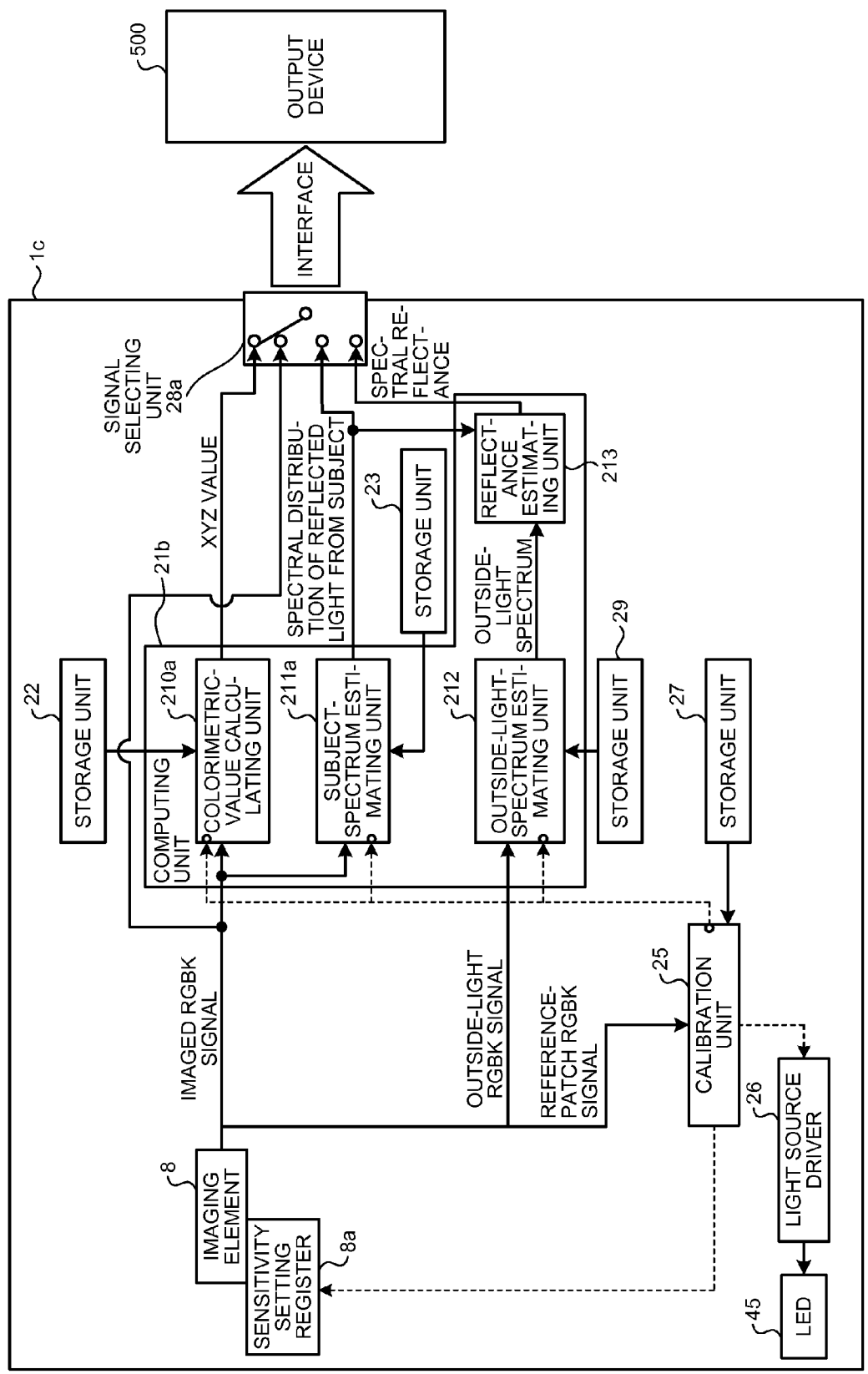
FIG. 16 is a functional block diagram of a computing system of the imaging device according to the third embodiment.

FIG. 16 is a functional block diagram of a computing system of the imaging device according to the third embodiment. A configuration of a functional block of the imaging device 1c is explained with reference to FIG. 16.

The imaging device 1c includes the imaging element 8, a computing unit 21b, the storage unit 22, the storage unit 23, the calibration unit 25, the light source driver 26, the storage unit 27, a signal selecting unit 28a, and a storage unit 29.

The computing unit 21b includes the colorimetric-value calculating unit 210a, the subject-spectrum estimating unit 211a, an outside-light-spectrum estimating unit 212 (a second estimating unit), and a reflectance estimating unit 213 (a third estimating unit).

The subject-spectrum estimating unit 211a outputs data of estimated per-pixel spectral distribution of reflected light from a subject to the signal selecting unit 28a, and also passes this data to the reflectance estimating unit 213.

The outside-light-spectrum estimating unit 212 corrects image data of an image of outside light having entered through the opening 41b (hereinafter, referred to as an outside-light RGBK signal) taken by the imaging element 8 according to a correction value calculated by the calibration unit 25. The outside-light-spectrum estimating unit 212 estimates a spectral distribution of the outside light from the corrected outside-light RGBK signal by the publicly-known Wiener estimation method using a covariance matrix as statistical information of outside light stored in the storage unit 29. Then, the outside-light-spectrum estimating unit 212 passes data of the estimated spectral distribution of the outside light to the reflectance estimating unit 213.

The reflectance estimating unit 213 divides the per-pixel spectral distribution of the reflected light from the subject received from the subject-spectrum estimating unit 211a by the spectral distribution of the outside light received from the outside-light-spectrum estimating unit 212, thereby estimating per-pixel spectral reflectance of the subject. Then, the reflectance estimating unit 213 outputs data of the estimated per-pixel spectral reflectance of the subject to the signal selecting unit 28a.

The signal selecting unit 28a selects any of a colorimetric value calculated by the colorimetric-value calculating unit 210a, an imaged RGBK signal from the imaging element 8, data of per-pixel spectral distribution of reflected light from a subject estimated by the subject-spectrum estimating unit 211a, and data of per-pixel spectral reflectance of the subject estimated by the reflectance estimating unit 213, and outputs the selected data to the output device 500.

As described above, the same effects as in the first and second embodiments can be achieved, and a correction value is calculated by calibration; therefore, in a state where the temporal variation in light sensitivity of the imaging element 8 is constantly compensated, the colorimetric-value calculating unit 210a, the subject-spectrum estimating unit 211a, and the outside-light-spectrum estimating unit 212 can calculate a colorimetric value, estimate a spectral distribution of reflected light from a subject, and estimate a spectral distribution of outside light, respectively.

Furthermore, the signal selecting unit 28a selects any of an imaged RGBK signal, a colorimetric value calculated by the colorimetric-value calculating unit 210a, data of spectral distribution of reflected light from a subject estimated by the subject-spectrum estimating unit 211a, and data of spectral reflectance of the subject estimated by the reflectance estimating unit 213, and outputs the selected data to the output device 500. Accordingly, data required for the output device 500 to perform image processing can be selected and input from the imaging device 1c.

Furthermore, as described above, highly-accurate spectral reflectance of a subject can be estimated by the reflectance estimating unit 213; therefore, even a different type of light source can perform favorable color reproduction, for example, in the output device 500, etc.

Incidentally, the interpolation computing unit 24 of the imaging device 1a according to the variation of the first embodiment can be applied to the imaging device 1c according to the present embodiment.

Furthermore, as shown in FIG. 16, the imaging device 1c includes the computing unit 21b, and a colorimetric value is calculated by the colorimetric-value calculating unit 210a of the computing unit 21b, a spectral distribution of reflected light from a subject is estimated by the subject-spectrum estimating unit 211a, a spectral distribution of outside light is estimated by the outside-light-spectrum estimating unit 212, and spectral reflectance of the subject is estimated by the reflectance estimating unit 213; however, the present invention is not limited to this configuration. That is, the imaging device 1c does not have to include the computing unit 21b; for example, the computing unit 21b can be included in an external device such as the output device 500, and the external device can execute a computing function of the computing unit 21b according to a received imaged RGBK signal, outside-light RGBK signal, and correction value. Furthermore, not the computing unit 21b itself but at least any of the colorimetric-value calculating unit 210a, the subject-spectrum estimating unit 211a, the outside-light-spectrum estimating unit 212, and the reflectance estimating unit 213 can be included in the external device.

Fourth Embodiment

An imaging device according to a fourth embodiment is explained with a focus on differences from the configuration and operation of the imaging device 1c according to the third embodiment.

Structure of Main Section of Imaging Device

Figure 17:
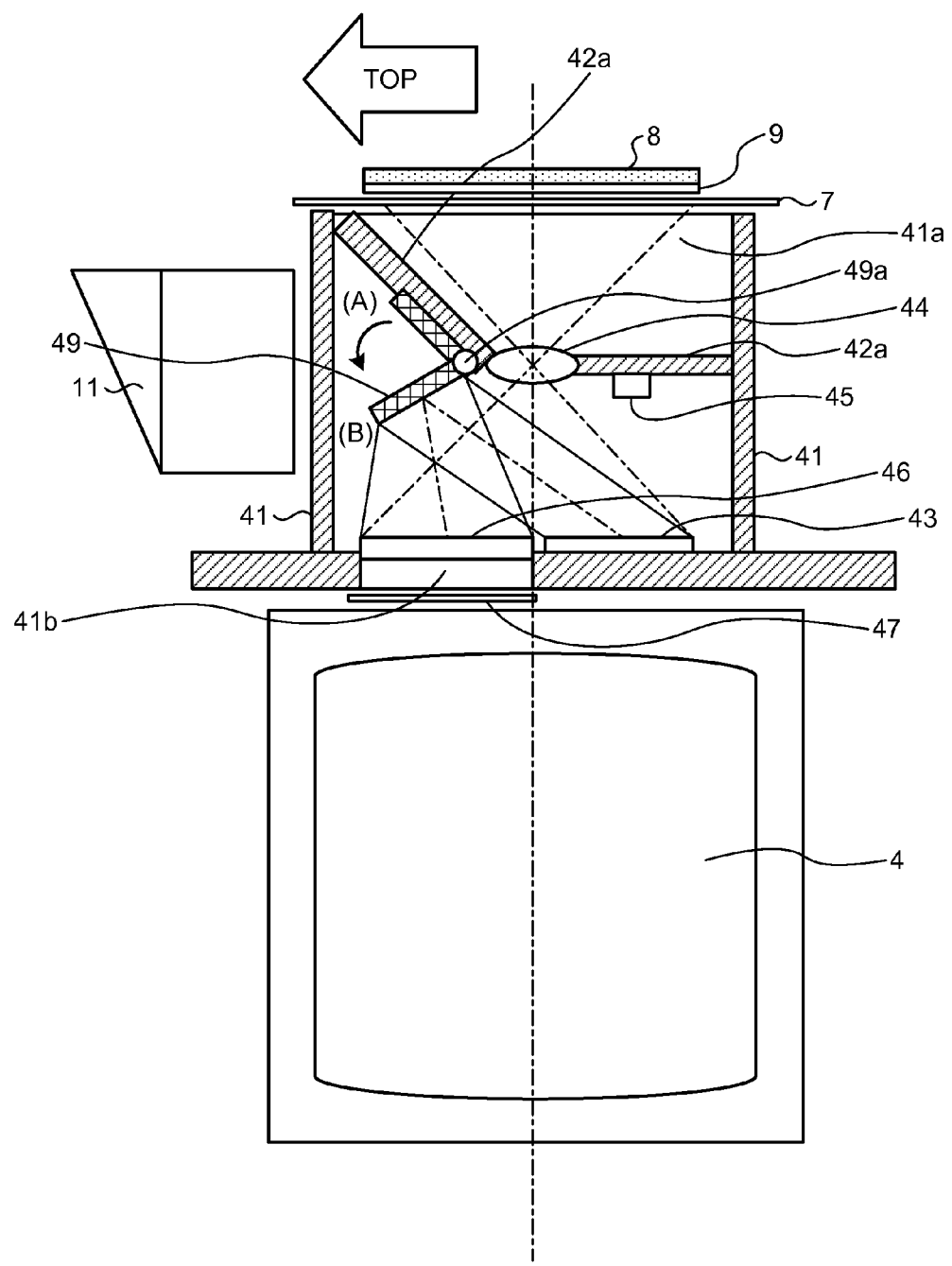
FIG. 17 is a diagram showing an example of the structure of a main section of an imaging device according to a fourth embodiment.

FIG. 17 is a diagram showing an example of the structure of a main section of the imaging device according to the fourth embodiment. The structure of a main section of an imaging device 1d according to the present embodiment is explained with reference to FIG. 17.

FIG. 17 is a right side view of the main section including the lens 4 of the imaging device 1d. In the imaging device 1d according to the present embodiment, the box-shaped enclosure 41 is placed adjacent to the mirror 6 in the same manner as in the second and third embodiments. One side of the enclosure 41 is open (has the opening 41a), and the opening 41a is opposed to the shutter 7, the imaging element 8, and the filter 9. Inside the enclosure 41, a first partition plate 42a is placed; the first partition plate 42a extends from the inner wall surface on the side opposite to the pentaprism 11 to near the center of the enclosure 41 roughly parallel to the surface of the plate-like imaging element 8, and further extends to the periphery of the opening 41a.

The imaging lens 44 is placed on the center of the first partition plate 42a, and a movable mirror 49 is placed on the lens 4 side surface of the first partition plate 42a extending from near the imaging lens 44 to the periphery of the opening 41a. The movable mirror 49 is installed so that the movable mirror 49 can turn about a movable shaft 49a installed roughly parallel to the surface of the imaging element 8 and roughly parallel to the inner wall surface of the enclosure 41 on the side of the pentaprism 11.

Out of inner wall surfaces of the enclosure 41 on the side of the lens 4, the reference chart part 43 (see FIG. 12) is placed on the surface opposite to the pentaprism 11 based on the position opposed to the imaging lens 44, and the opening 41b is formed on the surface on the side of the pentaprism 11. The diffuser panel 46 for diffusing light passing therethrough is placed so as to cover the opening 41b from the inside of the enclosure 41. Furthermore, the shutter 47 for opening and closing the opening 41b is placed in the opening 41b. Moreover, the LED 45 (an illuminating unit) is placed on the surface of the first partition plate 42a opposed to the inner wall surface with the reference chart part 43 placed thereon.

When the calibration unit 25 performs calibration using light from the LED 45 and when the outside-light-spectrum estimating unit 212 estimates a spectral distribution of outside light, the movable mirror 49 turns to the position in contact with the first partition plate 42a (a position (A) in FIG. 17) about the movable shaft 49a. Furthermore, when the calibration unit 25 performs calibration using outside light, the movable mirror 49 turns to the position in which outside light having entered through the opening 41b is reflected and emitted to the reference chart part 43 (a position (B) in FIG. 17) about the movable shaft 49a.

In the case of the present embodiment, calculation of a colorimetric value by the colorimetric-value calculating unit 210a of the imaging device 1d, estimate of a spectral distribution of reflected light from a subject by the subject-spectrum estimating unit 211a, and estimate of a spectral distribution of outside light by the outside-light-spectrum estimating unit 212 are performed separately from calibration. When the calibration unit 25 performs calibration using light from the LED 45, the movable mirror 49 turns to the position (A) in FIG. 17, and, in a state where the shutter 47 is closed, the light emitted from the LED 45 is reflected by the reference chart part 43, and passes through the imaging lens 44 and imaged by the imaging element 8. On the other hand, when calibration using outside light is performed, the movable mirror 49 turns to the position (B) in FIG. 17, and, in a state where the shutter 47 is open, the outside light having entered through the opening 41b passes through the imaging lens 44 and imaged by the imaging element 8. Incidentally, either the calibration using light from the LED 45 or the calibration using outside light can be selected through an operation unit (not shown) of the imaging device 1. Furthermore, the calibration can be performed, for example, at predetermined time intervals.

Block Configuration of Imaging Device

Figure 18:
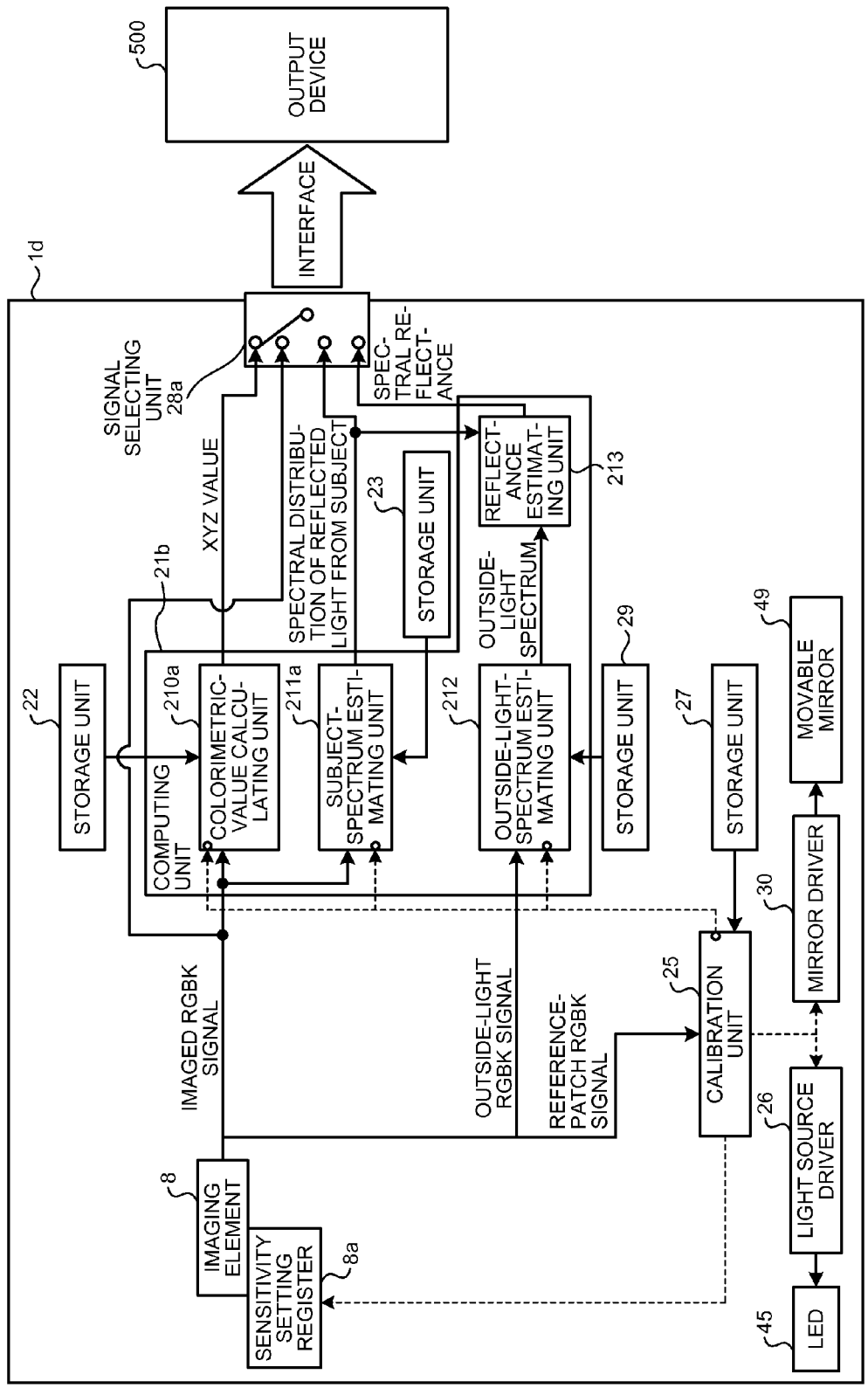
FIG. 18 is a functional block diagram of a computing system of the imaging device according to the fourth embodiment.

FIG. 18 is a functional block diagram of a computing system of the imaging device according to the fourth embodiment. A configuration of a functional block of the imaging device 1d is explained with reference to FIG. 18.

The imaging device 1d includes the imaging element 8, the computing unit 21b, the storage unit 22, the storage unit 23, the calibration unit 25, the light source driver 26, the storage unit 27, the signal selecting unit 28a, the storage unit 29, and a mirror driver 30.

The calibration unit 25 performs calibration on the basis of image data of an image of the reference chart part 43 taken by the imaging element 8 (a reference-patch RGBK signal). When the calibration unit 25 performs calibration using light from the LED 45, at the time of imaging operation of the imaging element 8, the calibration unit 25 controls the mirror driver 30 so as to turn the movable mirror 49 to the position (A) in FIG. 17, and controls the light source driver 26 so as to turn on the LED 45. On the other hand, when the calibration unit 25 performs calibration using outside light, at the time of imaging operation of the imaging element 8, the calibration unit 25 controls the mirror driver 30 so as to turn the movable mirror 49 to the position (B) in FIG. 17, and controls the light source driver 26 so as to turn off the LED 45. The storage unit 27 stores therein respective colorimetric values of the patches 100 set in the chart image area 430 measured by using outside light and light from the LED 45 when the imaging device 1d is in initial state (for example, at the time of factory shipment, etc.). The mirror driver 30 and the movable mirror 49 serve as a switching unit.

Operation content of the calibration is as explained in the second embodiment; the calibration unit 25 stores a correction value based on outside light when performed calibration using the outside light or a correction value based on light from the LED 45 when performed calibration using the light from the LED 45 in the storage unit 27.

As described above, the same effects as in the first to third embodiments can be achieved, and calibration using outside light can be performed; therefore, it is possible to obtain a correction value through favorable calibration under imaging conditions.

Incidentally, the interpolation computing unit 24 of the imaging device 1a according to the variation of the first embodiment can be applied to the imaging device 1d according to the present embodiment.

According to the present invention, it is possible to manufacture the imaging device more easily.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An imaging device comprising:
   a filter formed of four different filter regions with four different spectral transmittances that three different spectral transmittances having characteristics of a color matching function and a spectral transmittance for extracting metallic black have been linearly transformed thereinto by a linear transformation matrix; and
   an imaging unit that takes an image of light which has come out from a subject, and has been collected by an optical system, and then has passed through the filter;
   wherein the filter has a spectral transmittance that out of the three different spectral transmittances having characteristics of the color matching function, a spectral transmittance corresponding to red color has been linearly transformed thereinto so that a spectral waveform having two peaks has a single-peak shape.

2. The imaging device according to claim 1, wherein sets of the four different filter regions as a unit are arranged in the filter.

3. The imaging device according to claim 1, wherein the filter is formed by coating a transparent plate with color materials with spectral transmittances approximate to the linearly-transformed spectral transmittances.

4. The imaging device according to claim 1, further comprising a calculating unit that calculates a colorimetric value on the basis of pixel data output from the imaging unit.

5. The imaging device according to claim 4, further comprising a first estimating unit that estimates a spectral distribution of reflected light from the subject on the basis of four kinds of pixel data output from the imaging unit.

6. The imaging device according to claim 5, further comprising:
   an intake unit that takes in outside light and leads the outside light to the imaging unit;
   a second estimating unit that estimates a spectral distribution of the outside light on the basis of output four kinds of pixel data obtained by the imaging unit taking an image of the outside light led by the intake unit; and
   a third estimating unit that divides the spectral distribution of the reflected light from the subject estimated by the first estimating unit by the spectral distribution of the outside light estimated by the second estimating unit, thereby estimating spectral reflectance of the subject.

7. An imaging system according to claim 1 comprising:
   the imaging device of claim 1; and
   a calculating unit that calculates a colorimetric value on the basis of pixel data output from the imaging unit.

8. The imaging system according to claim 7, further comprising a first estimating unit that estimates a spectral distribution of reflected light from a subject on the basis of four kinds of pixel data output from the imaging unit.

9. The imaging system according to claim 8, further comprising:
an intake unit that takes in outside light and leads the outside light to the imaging unit;
a second estimating unit that estimates a spectral distribution of the outside light on the basis of output four kinds of pixel data obtained by the imaging unit taking an image of the outside light led by the intake unit; and
a third estimating unit that divides the spectral distribution of the reflected light from the subject estimated by the first estimating unit by the spectral distribution of the outside light estimated by the second estimating unit, thereby estimating spectral reflectance of the subject.

10. The imaging system according to claim 7, further comprising:
a reference chart part on which one or more reference patches have been formed;
an illuminating unit that illuminates the reference chart part; and
a calibration unit that calculates a correction value for correcting pixel data output from the imaging unit on the basis of initial colorimetric values of the reference patches illuminated by the illuminating unit and output pixel data obtained by the imaging unit taking an image of light that illumination light from the illuminating unit has been reflected by the reference chart part.

11. The imaging system according to claim 7, further comprising:
a reference chart part on which one or more reference patches have been formed;
an illuminating unit that illuminates the reference chart part;
a switching unit that switches whether or not to lead outside light so as to illuminate the reference chart part; and
a calibration unit that when performing calibration based on outside light, switches the switching unit to illuminate the reference chart part with outside light and calculates a correction value for correcting pixel data output from the imaging unit on the basis of initial colorimetric values of the reference patches illuminated with outside light and output pixel data obtained by the imaging unit taking an image of the outside light reflected by the reference chart part, and when performing calibration based on illumination light from the illuminating unit, switches the switching unit not to illuminate the reference chart part with outside light and calculates a correction value for correcting pixel data output from the imaging unit on the basis of initial colorimetric values of the reference patches illuminated with illumination light from the illuminating unit and output pixel data obtained by the imaging unit taking an image of the illumination light reflected by the reference chart part.

12. The imaging system according to claim 7, further comprising an interpolation computing unit that interpolates pixel data output from the imaging unit by pixel data of a given pixel area centered on pixels of the pixel data and sets the interpolated pixel data as new pixel data.

13. An imaging system according to claim 1 comprising:
the imaging device of claim 1;
a calculating unit that calculates a colorimetric value on the basis of pixel data output from the imaging unit;
a first estimating unit that estimates a spectral distribution of reflected light from a subject on the basis of four kinds of pixel data output from the imaging unit;
an intake unit that takes in outside light and leads the outside light to the imaging unit;
a second estimating unit that estimates a spectral distribution of the outside light on the basis of output four kinds of pixel data obtained by the imaging unit taking an image of the outside light led by the intake unit;
a third estimating unit that divides the spectral distribution of the reflected light from the subject estimated by the first estimating unit by the spectral distribution of the outside light estimated by the second estimating unit, thereby estimating spectral reflectance of the subject; and
a selecting unit that selects at least any of the colorimetric value calculated by the calculating unit, the spectral distribution of the reflected light from the subject estimated by the first estimating unit, and the spectral reflectance of the subject estimated by the third estimating unit, and outputs the selected data to the outside.

14. An imaging method performed by an imaging device comprising a filter and an imaging unit, the filter formed of four different filter regions with four different spectral transmittances that three different spectral transmittances having characteristics of a color matching function and a spectral transmittance for extracting metallic black have been linearly transformed thereinto by a linear transformation matrix, the imaging unit taking an image of light which has come out from a subject and has been collected by an optical system and then has passed through the filter, and the imaging method comprising:
calculating a colorimetric value on the basis of pixel data output from an imaging unit;
estimating a spectral distribution of reflected light from a subject on the basis of four kinds of pixel data output from the imaging unit;
taking in outside light and leading the outside light to the imaging unit;
estimating a spectral distribution of the outside light on the basis of output four kinds of pixel data obtained by the imaging unit taking an image of the led outside light; and
estimating spectral reflectance of the subject by dividing the estimated spectral distribution of the reflected light from the subject by the estimated spectral distribution of the outside light;
wherein the filter has a spectral transmittance that out of the three different spectral transmittances having characteristics of the color matching function, a spectral transmittance corresponding to red color has been linearly transformed thereinto so that a spectral waveform having two peaks has a single-peak shape.

* * * * *